(12) United States Patent
Verploegen et al.

(10) Patent No.: US 7,249,668 B2
(45) Date of Patent: Jul. 31, 2007

(54) POSITIVE DISPLACEMENT SORTER SHOE

(75) Inventors: Rhonda J. Verploegen, Sparta, MI (US); Frank W. Veit, Spring Lake, MI (US); Brian J. Feenstra, Hudsonville, MI (US); Gerald A. Brouwer, Grandville, MI (US)

(73) Assignee: Dematic Corp., Grand Rapids, MI (US)

( * ) Notice: Subject to any disclaimer, the term of this patent is extended or adjusted under 35 U.S.C. 154(b) by 207 days.

(21) Appl. No.: 10/903,707

(22) Filed: Jul. 30, 2004

(65) Prior Publication Data

US 2005/0023108 A1    Feb. 3, 2005

Related U.S. Application Data

(60) Provisional application No. 60/492,144, filed on Aug. 1, 2003.

(51) Int. Cl.
*B65G 47/00* (2006.01)
(52) U.S. Cl. ............... 198/370.02; 198/370.01; 198/456; 198/457.01; 198/458; 198/890; 198/890.1
(58) Field of Classification Search ........... 198/370.01, 198/370.02, 456, 457.01, 458, 890, 890.1
See application file for complete search history.

(56) References Cited

U.S. PATENT DOCUMENTS

| | | | |
|---|---|---|---|
| 3,179,241 A | 4/1965 | Kain | 198/805 |
| 3,361,247 A | 1/1968 | Lauzon et al. | 198/38 |
| 3,426,887 A | 2/1969 | Ward et al. | 198/177 |
| 3,788,447 A | 1/1974 | Stephanoff | 198/41 |
| 3,807,314 A | 4/1974 | Slemmons | 104/148 R |
| 4,138,008 A | 2/1979 | Del Rosso | 198/365 |
| 4,526,271 A | 7/1985 | Finnighan | 198/648 |
| 4,675,582 A | 6/1987 | Hommes et al. | 318/38 |

(Continued)

FOREIGN PATENT DOCUMENTS

EP    0212027 A1    3/1987

(Continued)

OTHER PUBLICATIONS

Hesselink (Verploegen), Rhonda J. (inventor in present application), undergraduate thesis entitled "Theoretical and Practical Application of Linear Motors in Linear Positive Package Sorting Machines," Jun. 2000.

*Primary Examiner*—Gene O. Crawford
*Assistant Examiner*—Leslie A. Nicholson, III
(74) *Attorney, Agent, or Firm*—Van Dyke, Gardner, Linn & Burkhart, LLP

(57) ABSTRACT

A positive displacement sorter apparatus and method includes providing a plurality of interconnected slats defining an endless web, an upper run of the web defining a conveying surface. A plurality of pusher shoes are provided, each moving along at least one of the plurality of slats to laterally displace articles on the conveying surface. Each of the pusher shoes includes a diverting portion extending above the conveying surface. The diverting portion includes a diverting surface and a stop surface. The diverting surface contacts an article and laterally displaces that article. A lifting force is applied by the diverting surface to a portion of the article being diverted. The stop surface limits movement of the article relative to the pusher shoe.

54 Claims, 23 Drawing Sheets

U.S. PATENT DOCUMENTS

| | | | |
|---|---|---|---|
| 4,711,341 A | 12/1987 | Yu et al. | 198/370.02 |
| 4,732,260 A | 3/1988 | Canziani | 198/365 |
| 4,738,347 A | 4/1988 | Brouwer et al. | 198/370.02 |
| 4,760,908 A | 8/1988 | Houghton | 198/365 |
| 4,770,291 A | 9/1988 | Shaw | 198/851 |
| 4,800,818 A | 1/1989 | Kawaguchi et al. | 104/290 |
| 4,884,677 A | 12/1989 | Yu et al. | 198/370.02 |
| 4,896,760 A * | 1/1990 | Triantafilou et al. | 198/370.02 |
| 4,932,515 A | 6/1990 | Stöhr | 198/822 |
| 4,973,892 A | 11/1990 | Murata et al. | 318/135 |
| 5,027,939 A | 7/1991 | Kilper et al. | 198/365 |
| 5,038,912 A | 8/1991 | Cotter | 198/370 |
| 5,088,593 A | 2/1992 | Lewin | 198/619 |
| 5,127,510 A * | 7/1992 | Cotter et al. | 198/370.02 |
| 5,131,522 A * | 7/1992 | Fujio | 198/370.02 |
| 5,165,515 A | 11/1992 | Nitschke et al. | 198/349.95 |
| 5,167,315 A | 12/1992 | Doane | 198/370 |
| 5,172,803 A | 12/1992 | Lewin | 198/619 |
| 5,191,959 A * | 3/1993 | Leemkuil | 198/370.02 |
| 5,199,548 A | 4/1993 | Tanaka et al. | 198/502.4 |
| 5,218,277 A | 6/1993 | Pattison et al. | 318/135 |
| 5,285,886 A | 2/1994 | Ostholt et al. | 198/370 |
| 5,295,568 A | 3/1994 | Saito et al. | 198/330 |
| 5,333,715 A | 8/1994 | Sapp | 198/372 |
| 5,402,021 A | 3/1995 | Johnson | 310/12 |
| 5,409,095 A | 4/1995 | Hoshi et al. | 198/372 |
| 5,427,223 A | 6/1995 | Van Den Goor | 198/365 |
| 5,435,429 A | 7/1995 | Van Den Goor | 198/890.1 |
| 5,613,591 A | 3/1997 | Heit et al. | 198/370.02 |
| 5,657,858 A | 8/1997 | Van Den Goor | 198/890 |
| 5,732,814 A | 3/1998 | Owczarzak et al. | 198/890 |
| 5,909,797 A | 6/1999 | Van Den Goor | 198/370.02 |
| 5,927,465 A | 7/1999 | Shearer, Jr. | 198/370.02 |
| 5,927,466 A | 7/1999 | Rowley | 198/370.03 |
| 5,947,361 A | 9/1999 | Berger et al. | 226/92 |
| 5,967,289 A | 10/1999 | Kelsey | 198/370.02 |
| 5,975,277 A | 11/1999 | Skarlupka | 198/370.04 |
| 6,041,909 A | 3/2000 | Shearer, Jr. | 198/370.02 |
| 6,139,240 A | 10/2000 | Ando | 414/267 |
| 6,246,023 B1 | 6/2001 | Kugle | 209/584 |
| 6,292,710 B1 | 9/2001 | Bonnet | 700/230 |
| 6,357,574 B1 | 3/2002 | Eberle et al. | 198/465.4 |
| 6,361,268 B1 | 3/2002 | Pelrine et al. | 414/749.2 |
| 6,459,061 B1 | 10/2002 | Kugle et al. | 209/583 |
| 6,478,144 B1 | 11/2002 | Sweazy | 198/890 |
| 6,513,642 B1 | 2/2003 | Shearer, Jr. et al. | 198/370.02 |
| 6,513,649 B1 | 2/2003 | Lauzon et al. | 198/832.1 |
| 6,528,908 B1 | 3/2003 | Lee | 310/12 |
| 6,615,972 B2 | 9/2003 | Veit et al. | 198/370.02 |
| 6,814,216 B2 | 11/2004 | Veit et al. | 198/370.02 |
| 6,860,376 B1 * | 3/2005 | Heit et al. | 198/370.02 |
| 2003/0079971 A1 | 5/2003 | Veit | |

FOREIGN PATENT DOCUMENTS

| | | |
|---|---|---|
| EP | 0444734 B1 | 5/1994 |
| EP | 0602694 B1 | 3/1998 |
| EP | 0792824 B1 | 7/2000 |
| JP | 5711223 | 7/1982 |
| JP | 61-24500 | 7/1986 |
| JP | 64-38312 | 2/1989 |
| JP | 6438312 | 2/1989 |
| JP | 2-86923 | 7/1990 |
| JP | 4-223921 | 8/1992 |
| JP | 04223921 A * | 8/1992 |
| JP | 07061570 | 3/1995 |
| JP | 7-315561 | 12/1995 |
| JP | 7-323911 | 12/1995 |
| JP | 8-319021 | 12/1996 |
| JP | 9-52621 | 2/1997 |
| JP | 9-110149 | 4/1997 |
| JP | 09183517 | 7/1997 |
| JP | 09183518 | 7/1997 |
| JP | 09290914 | 11/1997 |
| JP | 11-193128 | 7/1999 |
| JP | 0-103518 | 4/2000 |
| JP | 0-118699 | 4/2000 |

* cited by examiner

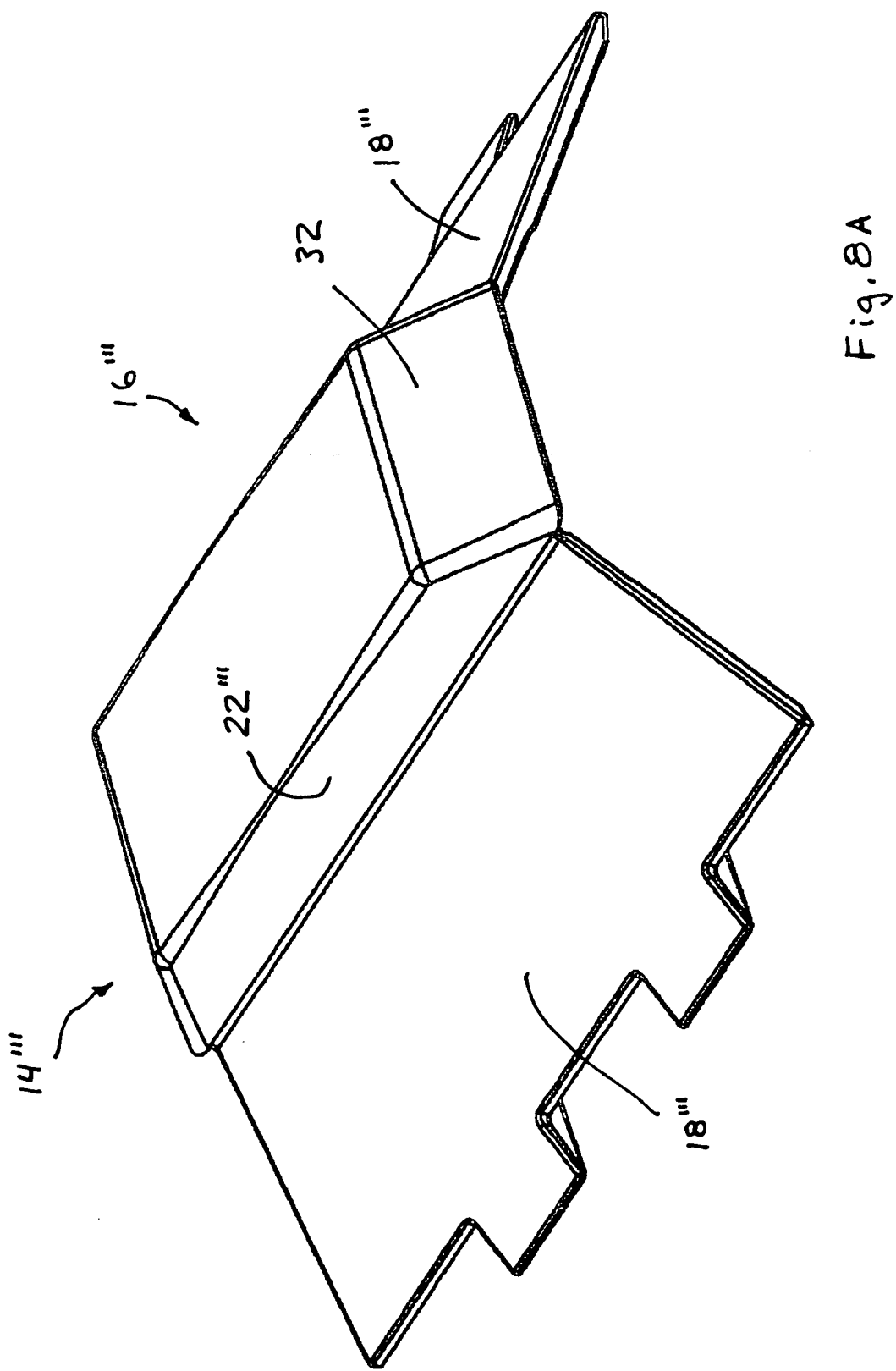

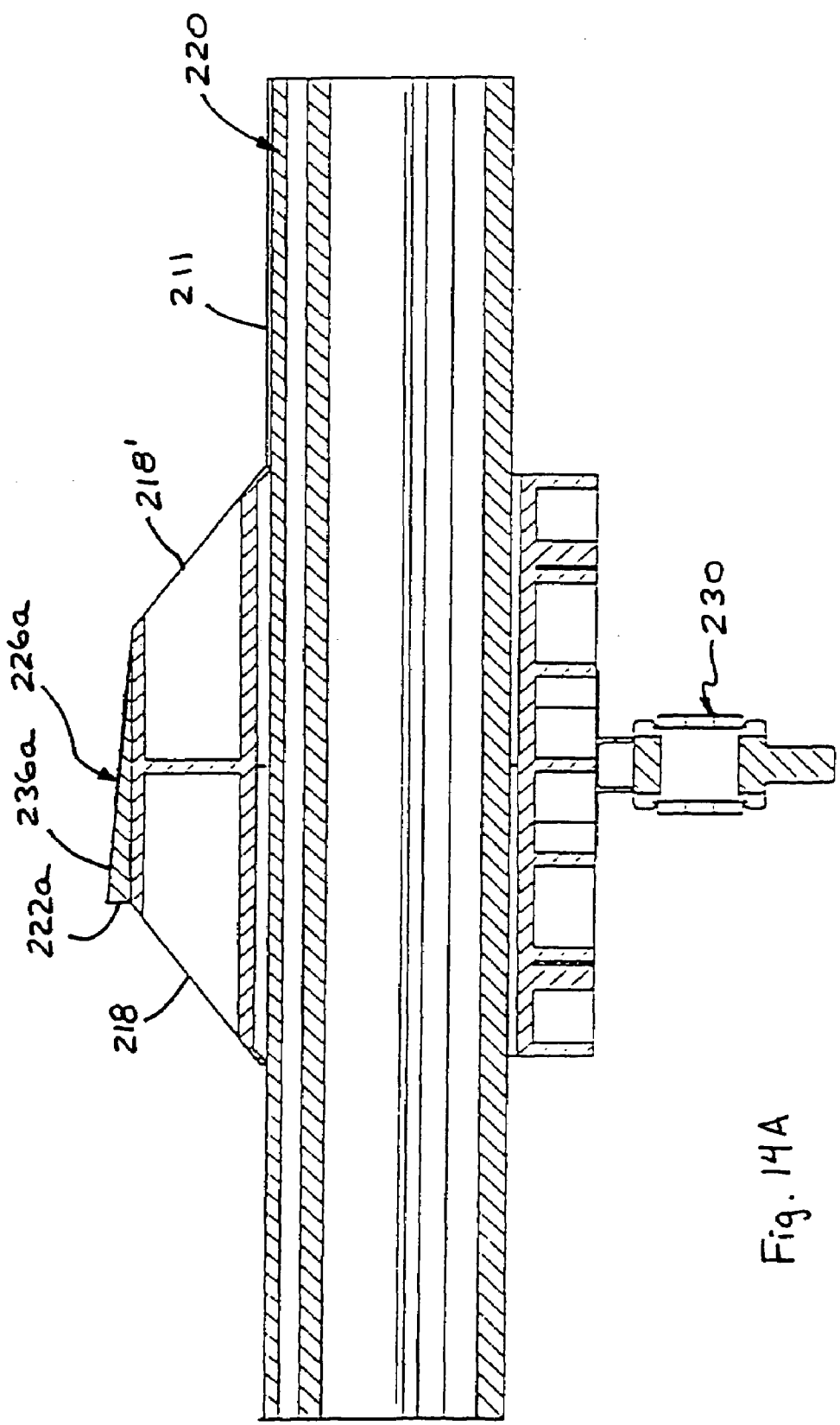

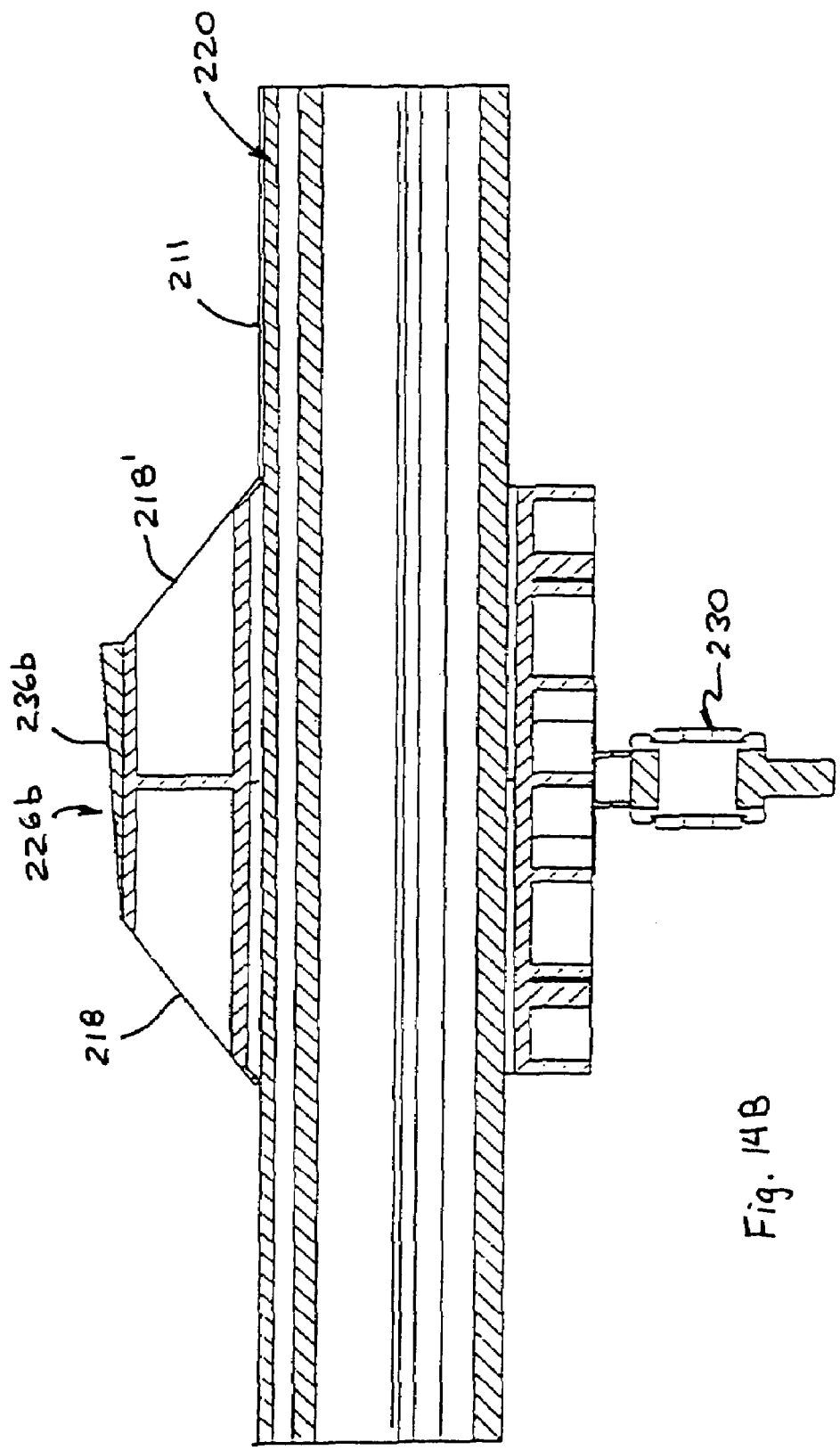

US 7,249,668 B2

POSITIVE DISPLACEMENT SORTER SHOE

CROSS REFERENCE TO RELATED APPLICATION

The present application claims benefit of U.S. provisional application, Ser. No. 60/492,144, filed Aug. 1, 2003, which is hereby incorporated herein by reference in its entirety.

FIELD OF THE INVENTION

This invention relates generally to conveyor sortation systems and, more particularly, to a pusher shoe for a positive displacement sorter.

BACKGROUND OF THE INVENTION

Positive displacement sortation conveyors are known having a main conveying surface and diverter shoes, or pusher shoes, that are generally used to displace articles laterally on the main conveying surface, such as when the articles are to be diverted upon one or more spur conveyor lines typically placed at an angle to the main conveying surface. Such conveyors may include a pair of endless chains or other connecting members and a plurality of members, such as slats, connected at their opposite ends to the chains or connecting members in order to provide a moving conveyor surface. Each slat, or a pair of slats, is fitted with a pusher or diverter shoe mounted in a manner such that the shoe moves laterally across the slat or slats. Movement of the shoe is guided by a guide track beneath the conveying surface. At the loading end of the sortation system, the shoes have a particular orientation with respect to the conveying surface. When an article is to be diverted to a particular spur line, a diverter assembly is actuated to switch shoes adjacent the article onto one or more diagonal tracks causing the effected shoes to glide across the slats to divert the article. Examples of such positive displacement sorters include commonly assigned U.S. Pat. Nos. 4,738,347 and 5,127,510. Other examples include U.S. Pat. Nos. 3,361,247; 5,409,095; and 4,884,677; and European Published Pat. Application Nos. EP 0 602 694 B1 and EP 0 444 734 A1.

As such positive displacement sorters increase in speed in order to handle increasing article, or product, throughput, lateral acceleration of the article by the pusher shoe can have detrimental effects. Such effects include, by way of example, tipping of the article, skewing of the article, ballistic separation of the article from the pusher shoe, and the like.

SUMMARY OF THE INVENTION

The present invention is directed to a positive displacement sorter apparatus, and method of sorting that overcomes the detrimental effects created by increased article throughput and the attendant lateral acceleration placed on the articles.

A positive displacement sorter apparatus and method, according to an aspect of the invention, includes providing a plurality of interconnected slats defining an endless web, an upper run of the web defining a conveying surface. A plurality of pusher shoes are provided, each moving along at least one of the plurality of slats to laterally displace articles on the conveying surface. Each of the pusher shoes includes a diverting portion extending above the conveying surface. The diverting portion includes a generally planar diverting surface and a generally planar stop surface extending upward from the diverting surface. The diverting surface contacts an article and laterally displaces that article. A lifting force is applied by the diverting surface to a portion of the article being diverted.

A positive displacement sorter apparatus and method, according to another aspect of the invention, includes providing a plurality of interconnected slats defining an endless web, an upper run of the endless web defining a conveying surface. A plurality of pusher shoes are provided, each moving along at least one of the plurality of slats to laterally displace articles on the conveying surface. Each of the pusher shoes includes a diverting portion extending above the conveying surface. The diverting portion includes a diverting surface. The diverting surface contacts an article and laterally displaces the article. The diverting surface is inclined with respect to the conveying surface from a lower portion adjacent the conveying surface to an upper portion, thereby applying a lifting force to a portion of the article being displaced. A generally vertical surface is provided which extends upwardly from the upper portion of the diverting surface.

A positive displacement sorter apparatus and method, according to another aspect of the invention, includes providing a plurality of interconnected slats defining an endless web, an upper run of the web defining a conveying surface. A plurality of pusher shoes are provided, each moving along at least one of the plurality of slats to laterally displace articles on the conveying surface. Each of the pusher shoes includes a diverting portion extending above the conveying surface. The diverting portion includes a diverting surface. The diverting surface contacts an article and laterally displaces that article. The diverting portion includes a shear joint. The shear joint is adapted to sever upon a force being applied to the pusher shoe that is above a particular level.

According to another aspect of the present invention, a positive displacement sorter apparatus includes a plurality of interconnected slats defining an endless web, with an upper run of the web defining a conveying surface. The apparatus includes a plurality of pusher shoes, with each shoe moving along at least one of the plurality of slats to laterally displace articles on the conveying surface. Each of the pusher shoes includes a diverting portion extending above the conveying surface. The diverting portion includes a lower surface and an upper surface extending upwardly from the lower surface. The lower surface comprises a first or primary or parallel diverting surface and a second or angled or diagonally diverting surface. The first diverting surface is generally normal to the direction of travel of the pusher shoe, and the second diverting surface is angled relative to the first diverting surface. The upper surface comprises a first stop surface and a second stop surface extending upwardly from the first diverting surface and the second diverting surface, respectively. The first diverting surface contacts an article and laterally displaces that article, while the first stop surface limits movement of the pusher shoe relative to the article. The second diverting surface may contact an article and may diagonally divert the article across the conveying surface, while the second stop surface limits movement of the pusher shoe relative to the article.

Therefore, the present invention provides a diverter or pusher shoe that includes a lower diverting surface and an upper stop surface. The diverting surface is angled to absorb the impact of the shoe against an article and to provide a lifting force to the article as the article is pushed or moved across the conveying surface by the pusher shoe. The stop surface limits movement of the shoe relative to the article to limit or substantially preclude the shoe from traveling under the object. The present invention thus provides enhanced control of the article as the article is moved by the pusher shoes and limits or reduces damage that may otherwise occur to the article upon impact of the pusher shoe against the article.

These and other objects, advantages, purposes and features of the present invention will become apparent upon review of the following specification in conjunction with the drawings.

BRIEF DESCRIPTION OF THE DRAWINGS

FIG. 8A is a perspective view of another pusher shoe of the present invention;

FIG. 14A is the same view as FIG. 14 of an alternative embodiment;

FIG. 14B is the same view as FIG. 14 of an alternative embodiment;

DESCRIPTION OF THE PREFERRED EMBODIMENTS

Figure 1:
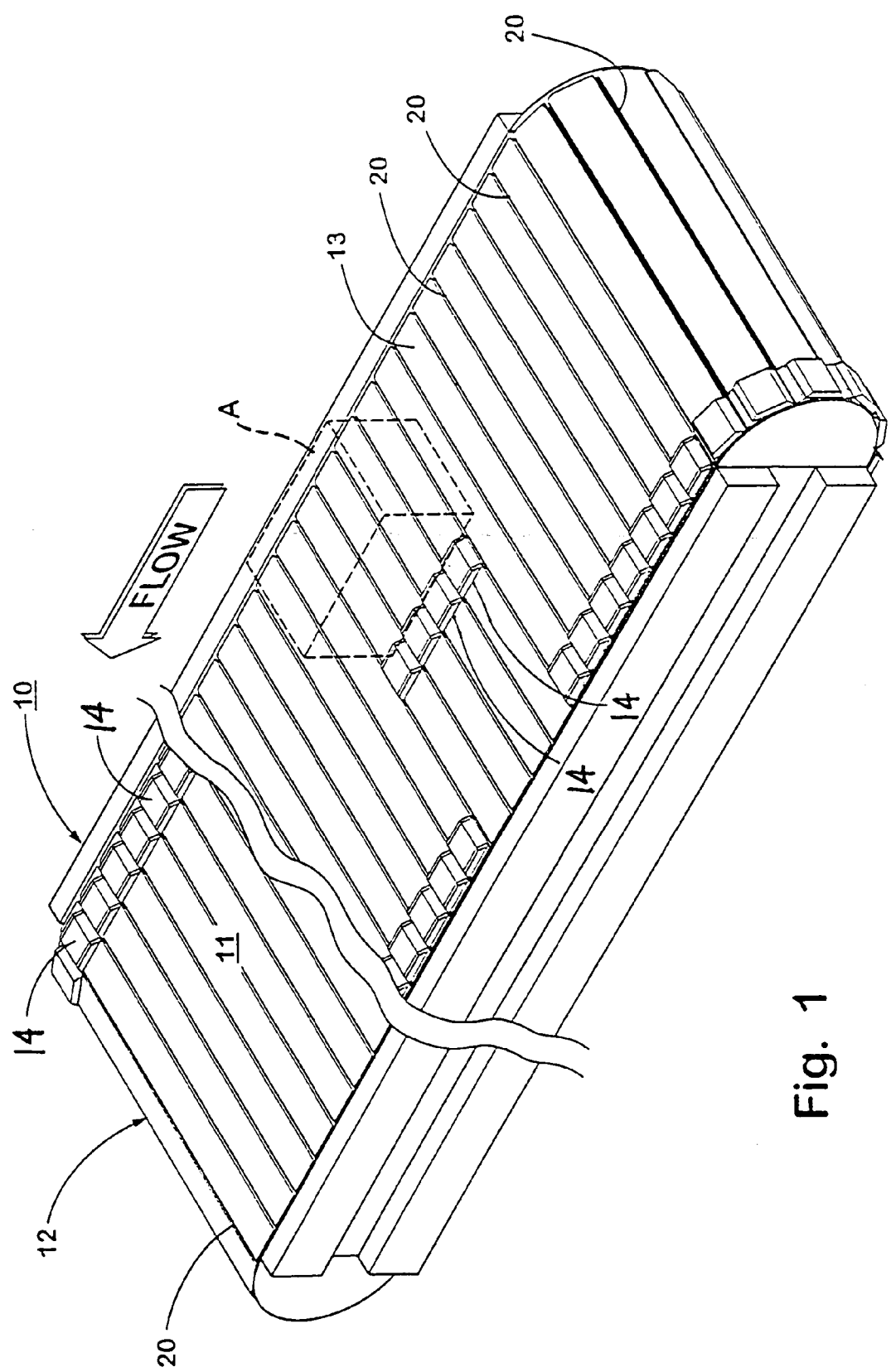
FIG. 1 is perspective view of a positive displacement sorter useful with the present invention.
Figure 2:
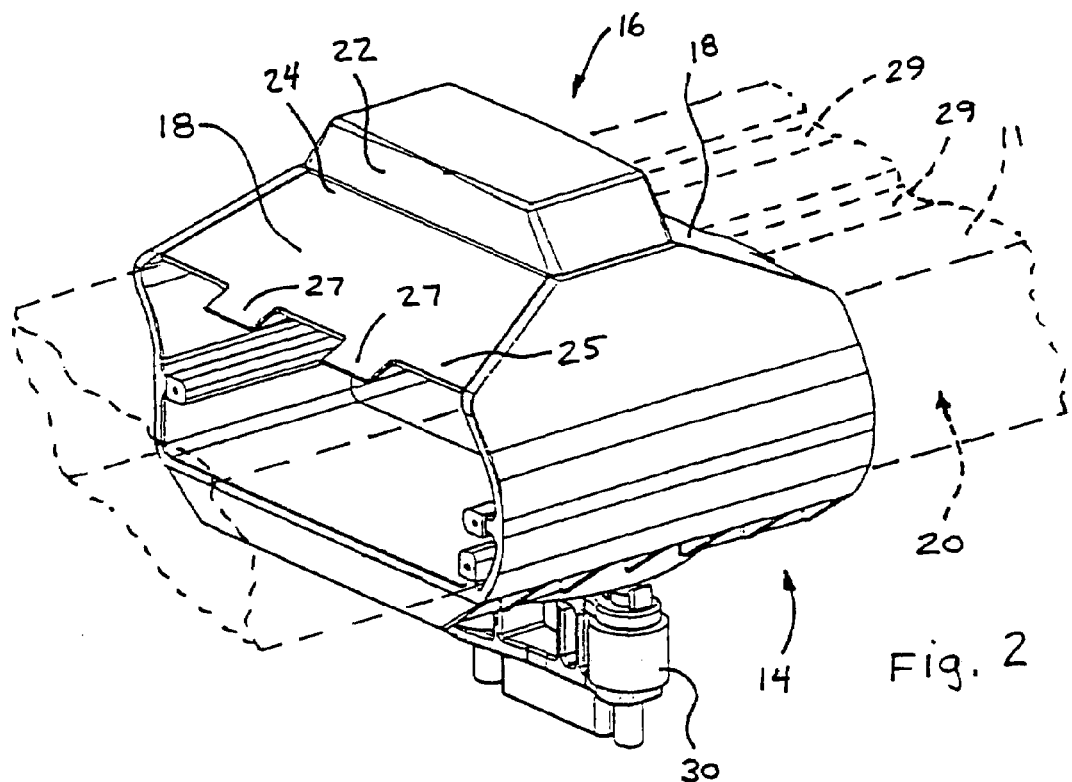
FIG. 2 is a perspective view of a pusher shoe or diverter shoe in accordance with the present invention.
Figure 3:
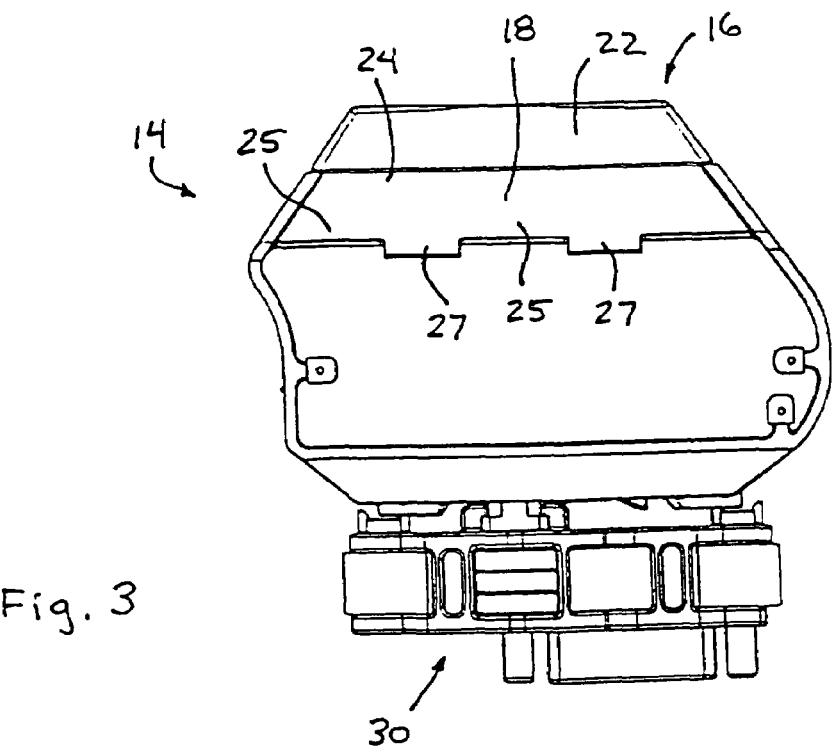
FIG. 3 is an end elevation of the pusher shoe of FIG. 2.
Figure 4:
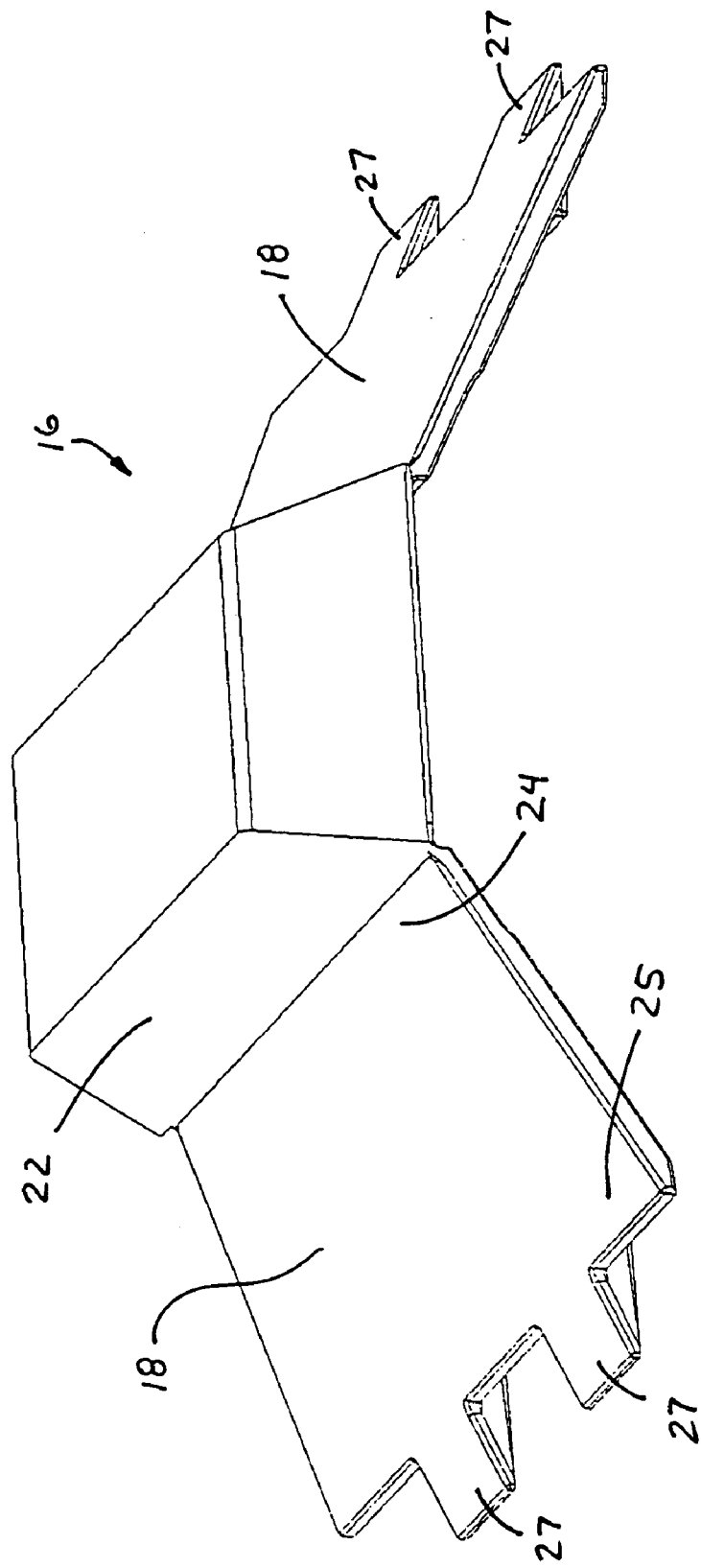
FIG. 4 is a perspective view of another pusher shoe of the present invention.

Referring now specifically to the drawings, and the illustrative embodiments depicted therein, a sorter assembly apparatus 10 is made up of a plurality of slats 20, which are interconnected in an endless web 12 with pusher shoes or diverter shoes 14 traveling along some or all of the slats, either on one slat or between two slats, to laterally displace articles A on a conveying surface 11 defined by a top run 13 of endless web 12 (FIG. 1). Diverter assemblies (not shown) laterally displace pusher shoes 14 to laterally divert articles supported on conveying surface 11 onto selected spurs (not shown) in order to sort the articles. To do this, the diverter assemblies include diverter rails (not shown) extending diagonally across the conveying surface beneath the web to engage transfer assemblies 30 below the conveying surface. Diverter switches (not shown) have actuators to divert the pusher shoe transfer assembly to individual diverter rails.

Sorter assembly 10 may be of the parallel divert type as disclosed in commonly assigned U.S. Pat. No. 5,165,515; of the diagonal divert type as disclosed in commonly assigned U.S. Pat. No. 5,127,510; or a combination of the parallel and diagonal divert type as disclosed in commonly assigned U.S. Pat. Nos. 6,041,909 and 5,927,465, the disclosures of which are all hereby incorporated herein by reference. To the extent not disclosed herein, sorter assembly 10 may be provided according to the principles set forth in commonly assigned U.S. pat. applications, Ser. No. 09/968,742, filed Sep. 28, 2001 by Veit et al. for a POSITIVE DISPLACEMENT SHOE AND SLAT SORTER APPARATUS AND METHOD, now U.S. Pat. No. 6,814,216; Ser. No. 09/840, 639, filed Apr. 23, 2001 by veit et al. for a SORTATION SYSTEM DIVERTER SWITCH, now U.S. Pat. No. 6,615, 972; Ser. No. 10/248,981, filed Mar. 3, 2003 by Veit et al. for a POSITIVE DISPLACEMENT SORTER. now U.S. Pat. No. 6,860,383; and Published International Publication Nos. WO 01/83342 A1, published Nov. 8, 2001, and WO 02/26602 A2, published Apr. 4, 2002, the disclosures of which are hereby incorporated herein by reference.

Terms, such as "front" and "rear" and the like, as used herein are relative terms to assist in understanding the disclosed embodiment and should not be considered limiting. References to "upper" and "lower" and the like, as used herein with respect to a slat or a pusher shoe are relative to the slat or the shoe in the upper run of the web. The terms "longitudinal" or "longitudinally" as used herein refer to the direction of movement of the endless web. The terms "lateral" or "laterally" as used herein refer to the direction from side-to-side of the conveying surface, or perpendicular to the direction of movement of the conveying surface.

Pusher shoe 14 includes a diverting portion 16, which extends above conveying surface 11 (FIGS. 1-5). The diverting portion includes a diverting surface 18, which contacts an article A and laterally displaces that article, and a stop surface 22, which may be a generally vertical surface extending upwardly from the upper end of diverting surface 18. In the illustrated embodiment of FIGS. 2-5, diverting surface 18 is a solid surface, but may also be defined by end portions of a series of spaced apart wall segments (such as shown in FIGS. 12-14B), as would be understood by those skilled in the art. The diverting surface 18 applies a lifting force to a portion of the article being displaced. This is accomplished by diverting surface 18 being at an incline with respect to the conveying surface 11. The diverting surface may be inclined with respect to the conveying surface at an angle that is less than 90 degrees. This angle may be less than approximately 45 degrees, and may be less than approximately 35 degrees. The diverting surface, in the illustrated embodiment, is at an angle that is approximately 25 degrees with respect to the conveying surface.

Figure 20:
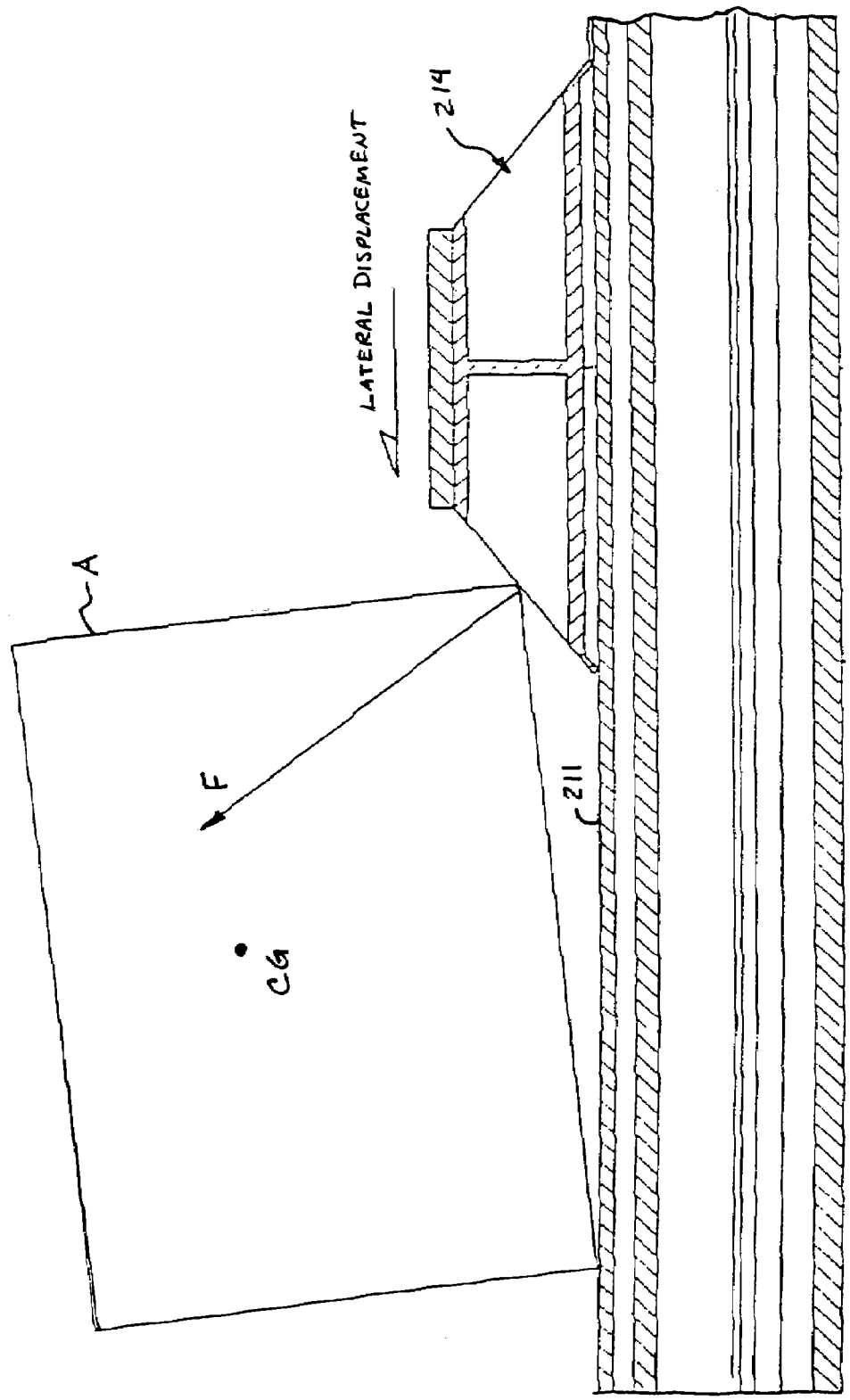
FIG. 20 is the same view as FIG. 14 illustrating lateral displacement of an article.

While the complete understanding of the manner in which lifting a portion of the article may not be fully understood, it is believed that the sloping surface absorbs acceleration of the article and tends to rotate the article in the direction of lateral movement of the article. As is illustrated in FIG. 20 (which depicts another embodiment of the diverting shoe of the present invention, discussed below), a force vector F is away from lateral movement of the center of gravity (CG) of the article A. Acceleration of the article A about its center of gravity (CG) is what normally tends to rotate the article clockwise, as illustrated in FIG. 20. This tends to topple the article being accelerated. By placing the force vector F away from the acceleration of the CG of the article, the rotation or toppling force on the article tends to be offset by a displacement force F in the direction of lateral displacement. It should be understood that this is merely an explanation and is not intended to be limiting.

When an article contacts diverting surface 18, the contacting portion of the article tends to ride up the diverting surface which is what applies the lifting force to that portion of the article being diverted and absorbs energy. For most articles, it has been found that the article tends to ride partway up the diverting surface to a point where a balance of forces tend to limit further movement between the pusher shoe and the article. However, certain types of packages may continue to ride up diverting surface 18. In order to avoid the pusher shoe passing beneath such packages, the stop surface 22 may be provided that extends upwardly from an upper portion 24 of diverting surface 18. An article riding up diverting surface 18 past upper portion 24 engages stop surface 22 which limits or arrests or substantially precludes further movement between the pusher shoe and the article. In the illustrated embodiment of FIGS. 2-5, stop surface extends substantially upward from the upper end of diverting surface 18 and at a greater angle than the diverting surface. Theoretically, there are no limits to the practical height of stop surface 22, which may be several inches, or more, in height for handling certain types of packages, such as soft packages.

Figure 5:
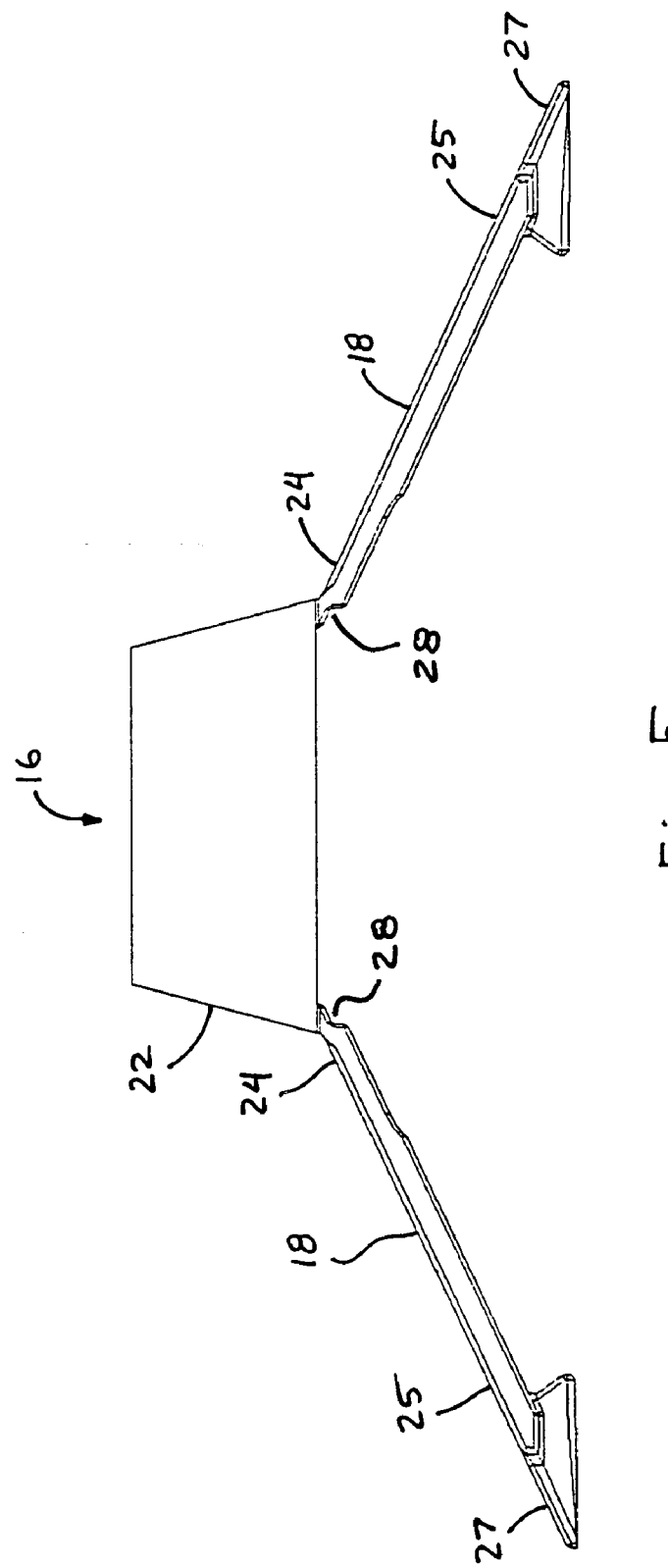
FIG. 5 is a side elevation of the pusher shoe of FIG. 4.

Optionally, the stop surface 22 may be defined at an upper portion or cap of the pusher shoe 16. As shown in FIG. 5, the cap may be formed at the upper end or portion of the diverting surface 18 and may have a shear joint or breakaway joint 28 at the junction of the cap and the upper portion of the diverting surface. The shear joint 28 may be defined by a narrow or thin portion of the pusher shoe 16, whereby the cap may break off from the pusher shoe if an article exerts excessive force against the stop surface. This functions to limit or substantially preclude damage to the transfer assembly or other parts of the shoe and sorter assembly. Optionally, the shear joint may be positioned elsewhere on the pusher shoe, such as along the lower portion of the diverting surface, such as at the tabs 27 (which may hook or snap onto the pusher assembly), such that the diverting surface may break free from the tabs when an excessive force is applied to the diverting surface and/or the stop surface, in order to limit or substantially preclude damage to the pusher assembly or transfer assembly.

Diverting surface 18 has a lower portion 25 adjacent to conveying surface 11. In the illustrated embodiment, lower portion 25 includes one or more downwardly extending tabs 27 which ride below conveying surface 11, namely within shallow slots or grooves or channels 29 defined in and along the upper portion of slat 20. The presence of the tab or tabs 27 assists the diverting surface 18 in extending or getting under the article in order to avoid occasionally diverting the article as a result of contact with lower portion 25.

Figure 6:
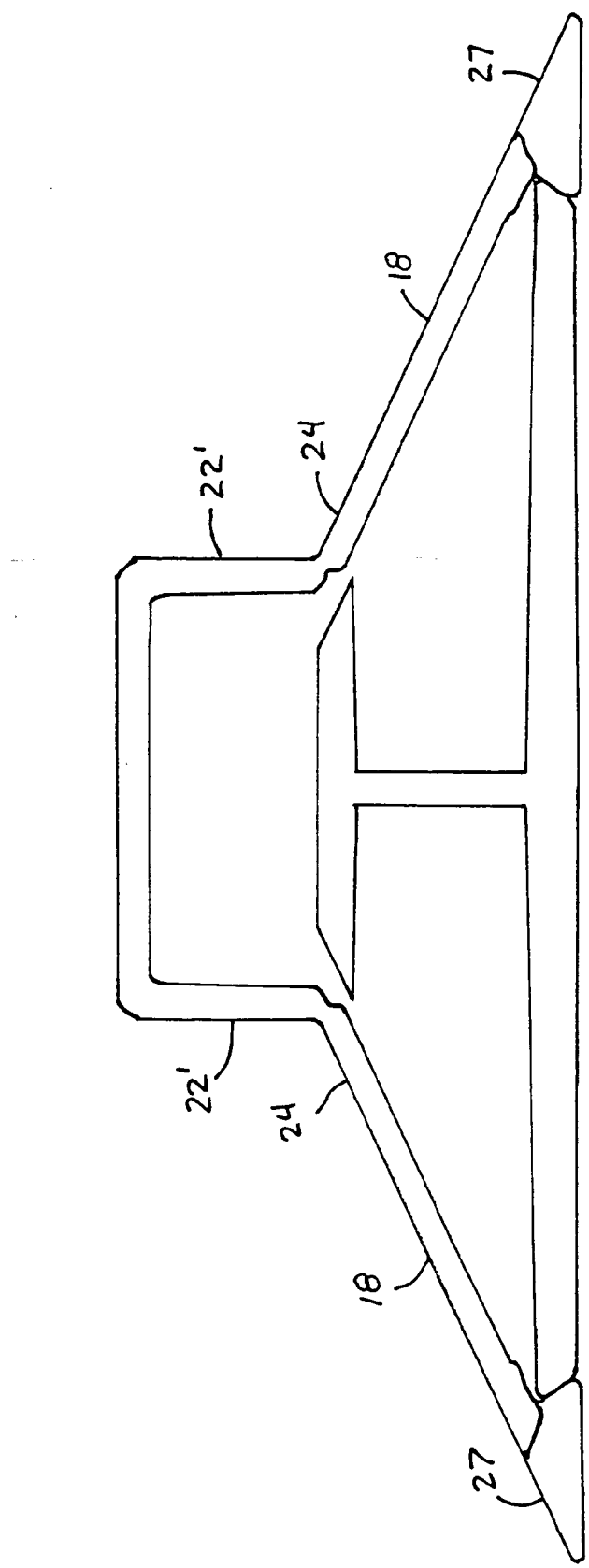
FIG. 6 is a side elevation of another pusher shoe of the present invention.
Figure 7:
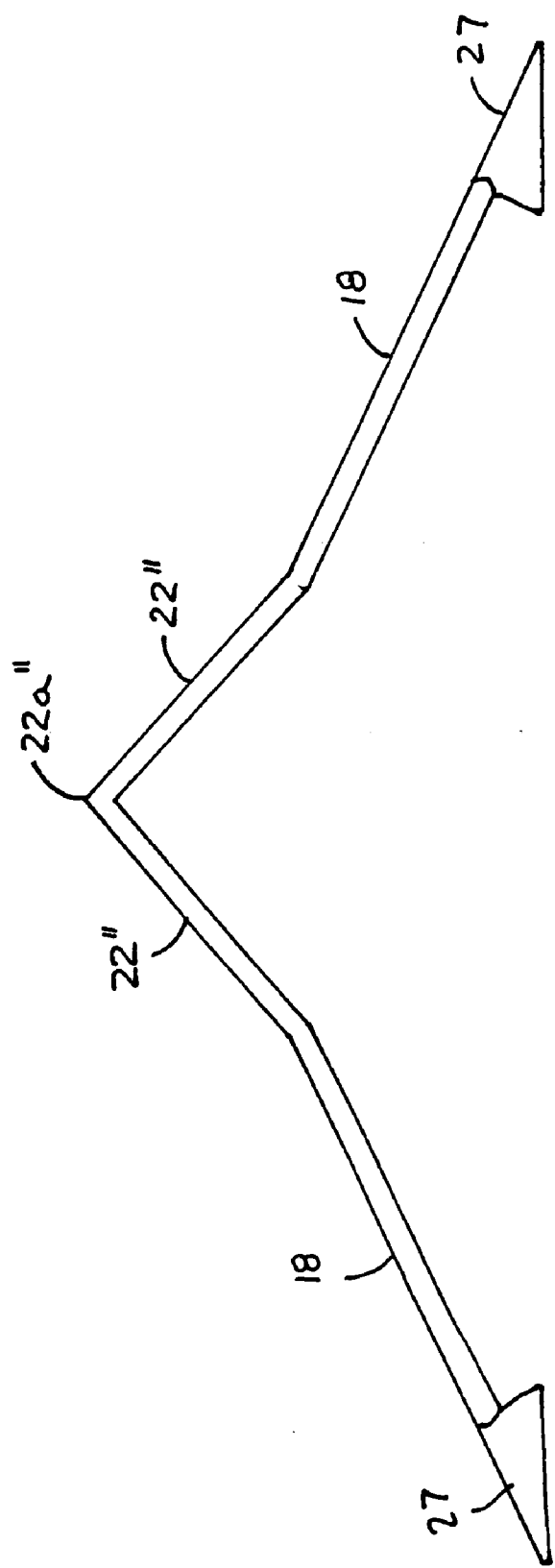
FIG. 7 is a side elevation of another pusher shoe of the present invention.

As shown in FIGS. 2-5, stop surface 22 may extend upwardly from diverting surface 18 and may be at an angle relative to the conveying surface that is greater than that of diverting surface 18. In the illustrated embodiment, the diverting surface is at an angle of approximately 25 degrees, while stop surface is at an angle of approximately 75 degrees. Clearly, other angles of the two surfaces may be implemented without affecting the scope of the present invention. For example, and with reference to FIG. 6, a stop surface 22' may be at about a 90 degree angle and thus may extend generally vertically upward from the upper portion 24 of diverting surface 18. Optionally, for example, and with reference to FIG. 7, the stop surfaces 22" at the upper portion 24 of the diverting surface 18 may be angled less than approximately 75 degrees, such as about 45 degrees, to further limit movement of the article up the diverting surface of the diverting shoe. As shown in FIG. 7, the stop surfaces 22" may intersect at the upper end 22a" of the diverter shoe.

As shown in FIGS. 2-7, the diverter or pusher shoes may include a diverting surface and a stop surface at both ends of the shoe so that the shoe may be utilized to move articles in either direction across a conveying surface. However, it is envisioned that the pusher shoe may be formed as a unidirectional shoe with a diverting surface and a stop surface at one end, but not at the other end, without affecting the scope of the present invention. Optionally, for example, and as discussed below with respect to FIGS. 14A and 14B, a pusher shoe may include a diverting surface and a generally vertical stop surface at one end and a diverting surface and ramped surface or upper diverting surface at the other end, without affecting the scope of the present invention.

Optionally, the pusher shoe may have one or both ends or sides angled or inclined to allow an article to ride up and over the shoe in situations where an article is engaged by the shoe when the shoe is moving back toward its initial position. For example, after a shoe or set of shoes has diverted an article across the conveying surface, the shoe or set of shoes is returned to its initial side of the conveying surface to prepare to receive or engage another article. While the shoe is moving back to the initial side, the shoe may contact an article that is being pushed or diverted across the conveying surface by an adjacent shoe or set of shoes. When such contact occurs, it is desirable that the article slide up and over the returning shoe so that the pushing shoe can continue to push or divert the article across the conveying surface.

Figure 8B:
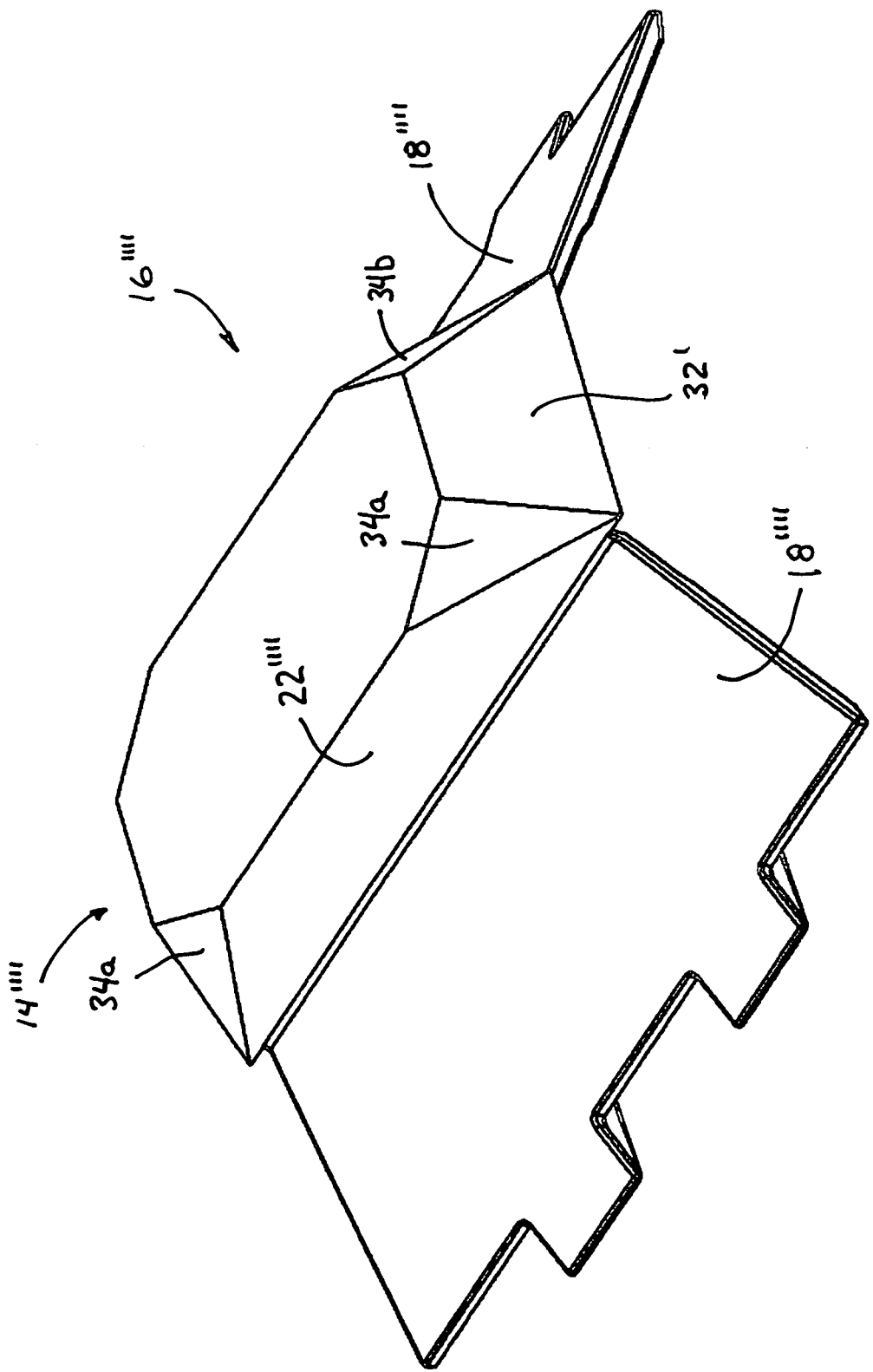
FIG. 8B is a perspective view of another pusher shoe of the present invention.
Figure 9A:
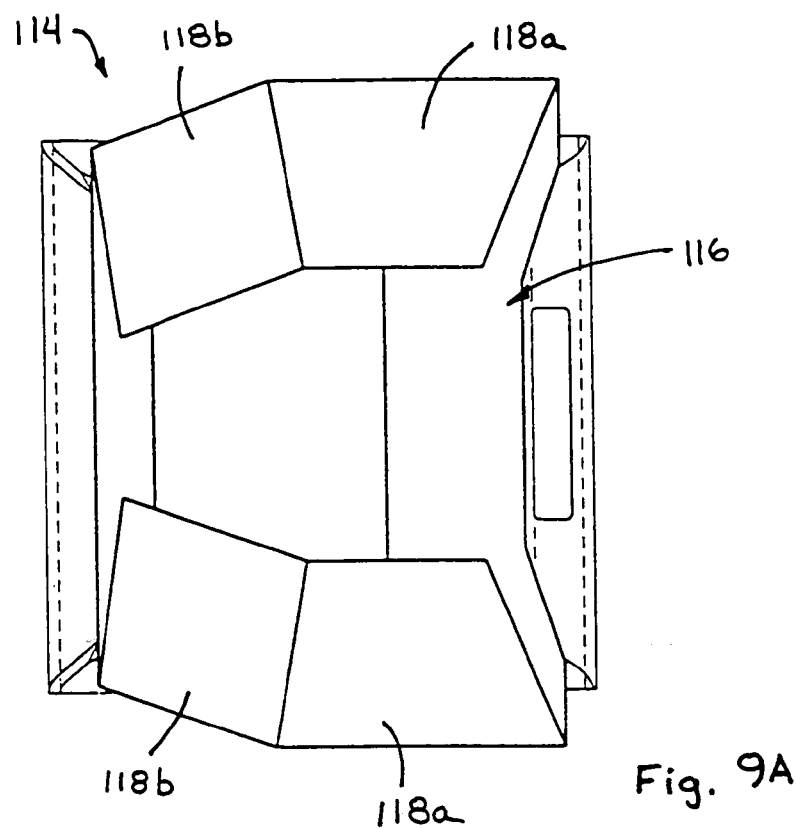
FIG. 9A is an end elevation of a multi-faceted pusher shoe in accordance with the present invention.
Figure 9B:
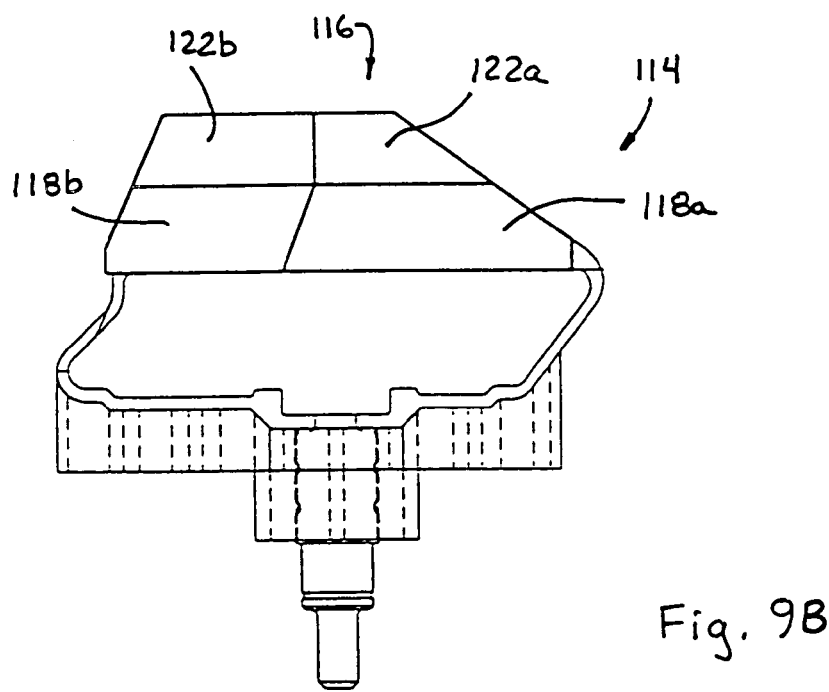
FIG. 9B is a top plan view of the pusher shoe of FIG. 9A.
Figure 9C:
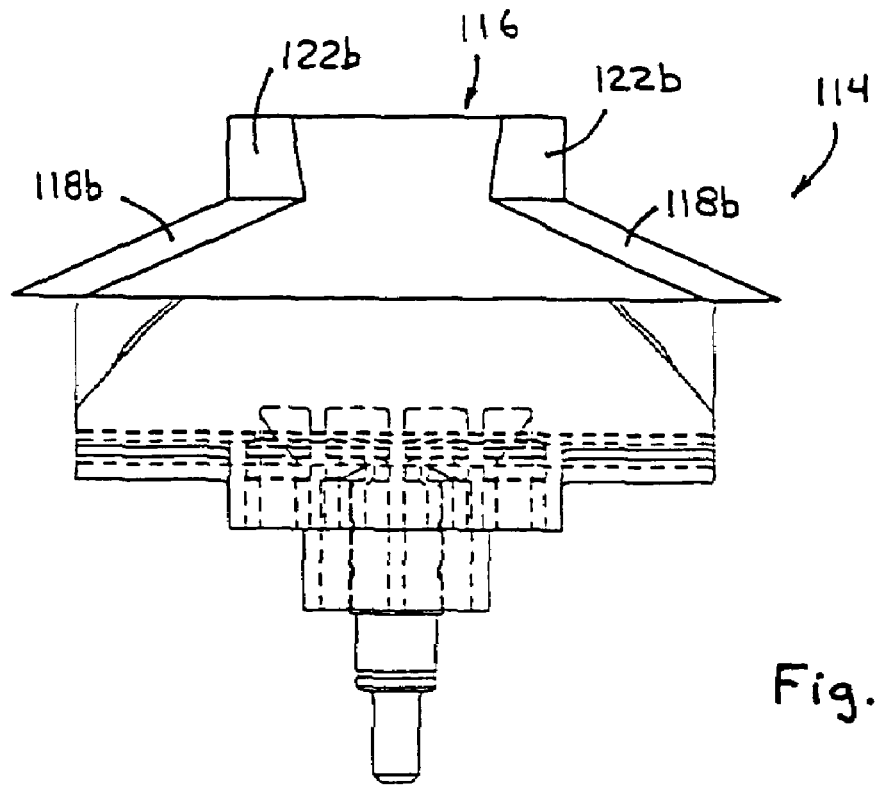
FIG. 9C is an end elevation of the pusher shoe of FIGS. 9A and 9B.
Figure 9D:
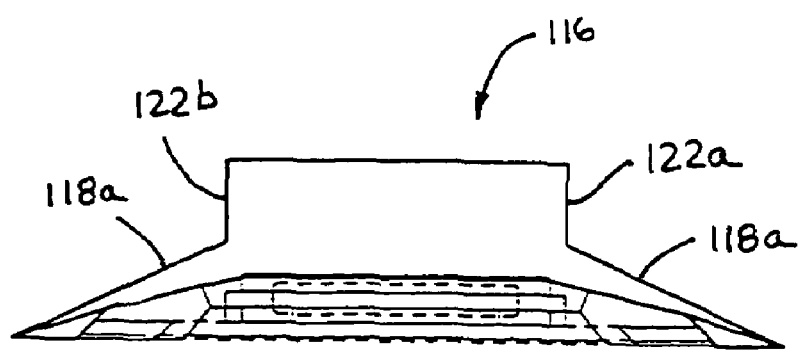
FIG. 9D is an end elevation of the other end of the pusher shoe of FIGS. 9A-C.

As shown in FIG. 8A, a pusher shoe 14''' may include a diverting portion 16''' that has sloped or inclined end surfaces 32, which may be at the ends or sides of the stop surfaces 22''' and generally above the diverting surfaces 18'''. Similarly, and as shown in FIG. 8B, a pusher shoe 14'''' may include a diverting portion 16'''' having a sloped or inclined end surface 32' at each end, and may include angled surfaces 34a, 34b at opposite sides of each end surface 32' and between the end surface 32' and the respective stop surface 22'''' at the upper portion of the diverting surface 18''''. The angled surfaces 34a, 34b allow an article that is contacted by the returning shoe to ride up and over the shoe without jamming or hanging up on the shoe as the article is moved in one direction (by another shoe or set of shoes) and contacts or encounters the shoe 14'''' that is being moved in the other direction.

Referring now to FIGS. 9A-D, a pusher shoe 114 may comprise a multi-faceted shoe having a diverting portion 116, which extends above the conveying surface as described above. The diverting portion 116 includes a multi-faceted diverting surface having diverting surfaces 118a, 118b and a multi-faceted stop surface having stop surfaces 122a, 122b. As can be seen with reference to FIGS. 9C and 9D, stop surfaces 122a, 122b may be oriented generally vertically at the upper portions of diverting surfaces 118a, 118b, but may be otherwise angled at a greater angle relative to the conveying surface than that of the diverting surfaces, without affecting the scope of the present invention. The diverting surfaces 118a, 118b are generally planar surfaces and oriented at an angle such that one surface 118a comprises a parallel diverting surface or primary or initial diverting surface and is generally normal to the longitudinal direction of the slat, while the other surface 118b is at an angle toward one side of the slat, and thus may comprise a diagonal diverting surface or secondary diverting surface. The angled or diagonal diverting surface 118b allows the pusher shoes to angle an article or move the article diagonally across the conveying surface while maintaining substantially uniform contact between the article and the pusher shoe. The first or initial surface 118a may initially contact the article whereby the article may then rotate or pivot into alignment with the secondary or angled diverting surface to move the article at an angle across the conveying surface.

The multi-faceted diverting surface 118 thus may provide a first or main or primary or parallel diverting surface 118a that at least initially engages the article. As disclosed in commonly assigned U.S. Pat. Nos. 6,041,909 and 6,513,642 issued to Shearer et al., the disclosures of which are hereby incorporated herein by reference, the sorter assembly may divert articles of certain length using parallel diverting, and may divert articles of different lengths using diagonal diverting. When used for parallel diverting, primary diverting surface 118a pushes and moves an article across the conveying surface. Alternately, when used for diagonal diverting, the angled or secondary diverting surface 118b may be arranged at an angle relative to the primary or initial diverting surface 118a and may function to push and move an article diagonally across the conveying surface. The primary or initial diverting surface 118a may initially contact the article to cause the article to rotate or pivot into alignment with the secondary or angled diverting surface 118b as the pusher shoes are moved across the conveying surface. The end surface or surfaces may be inclined to assist in allowing an article to ride over the pusher shoe when the shoe contacts an article when returning to the initial position, such as described above with respect to angled end surfaces 32, 32'.

Figure 10:
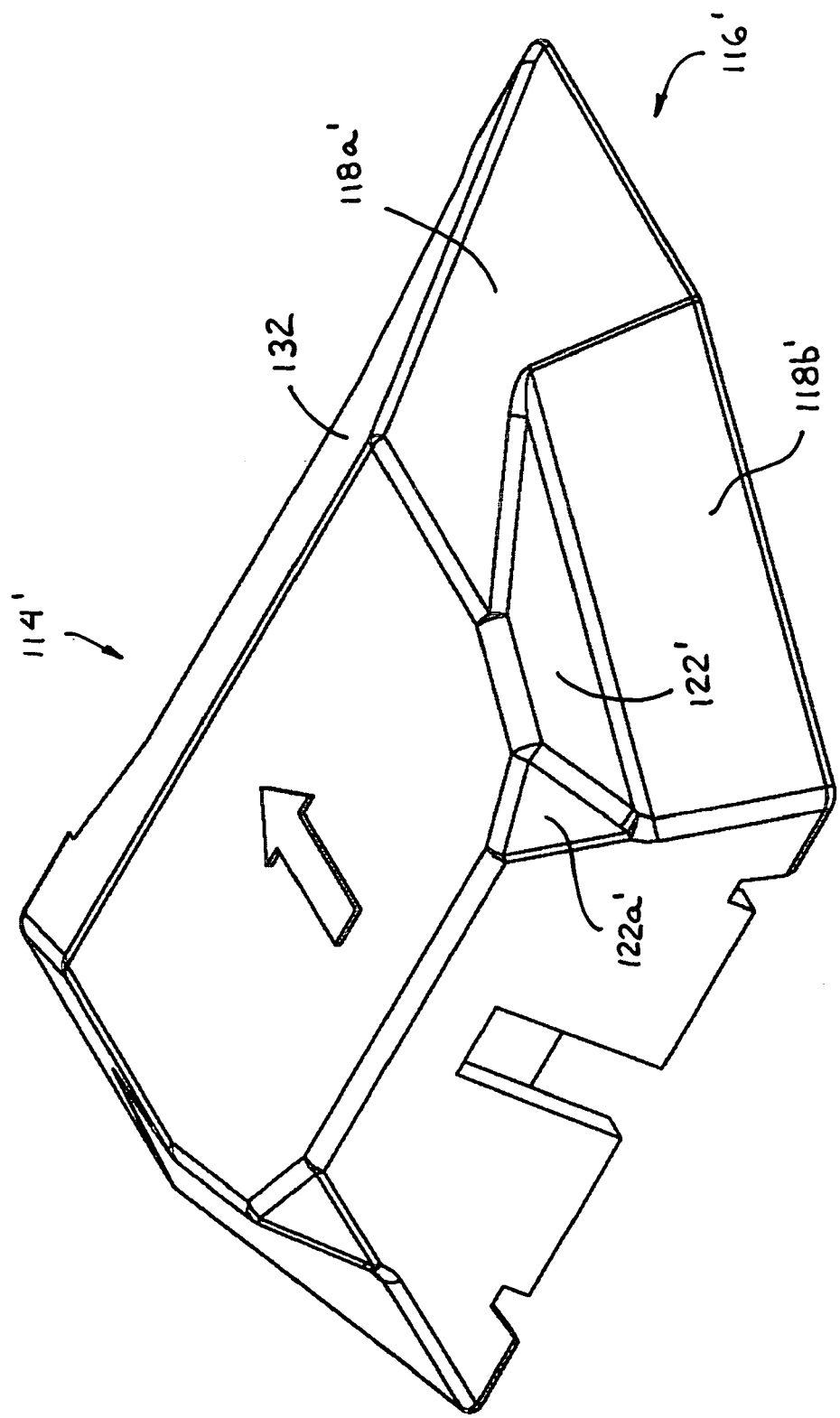
FIG. 10 is a perspective view of another pusher shoe of the present invention.

Optionally, and as shown in FIG. 10, a multi-faceted pusher shoe 114' may include a diverter portion 116' having a primary or initial diverting surface 118a' and an angled or secondary or diagonal diverting surface 118b', with a generally vertical stop surface 122' extending generally upward from the secondary diverting surface 118b'. The primary or initial diverting surface 118a' may extend from the lower portion of the shoe (and generally at the conveying surface) to the upper portion of the shoe (and generally at the upper end or portion of the stop surface 122'). The end surface 132 may be angled or inclined to allow an article to ride over the pusher shoe when the shoe contacts an article when returning to the initial position, such as described above with respect to angled end surfaces 32, 32'. The stop surface 122' may also include an angled or inclined surface 122a' at an end thereof to limit jamming of articles at the pusher shoe.

Figure 11:
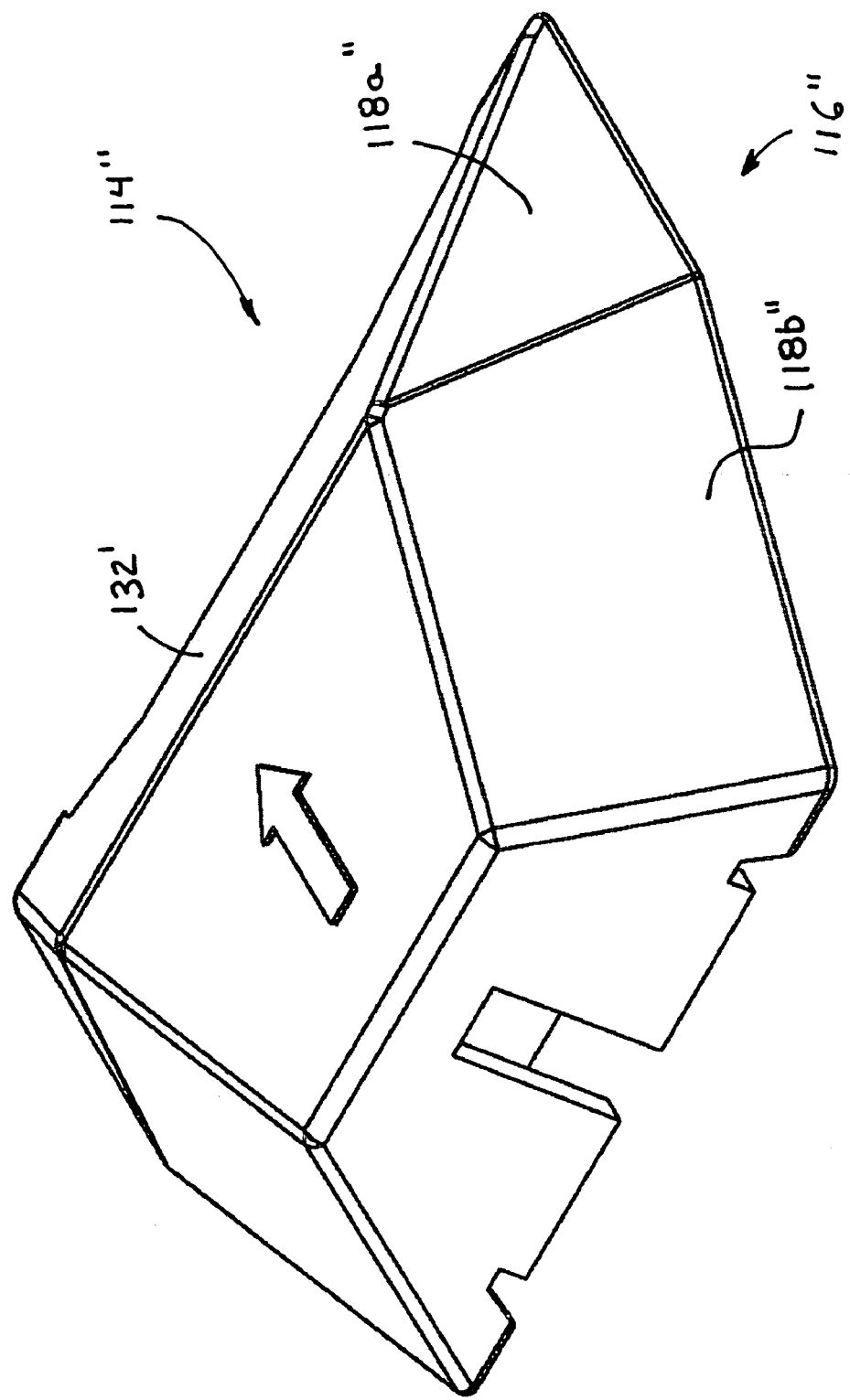
FIG. 11 is a perspective view of another pusher shoe of the present invention.
Figure 12:
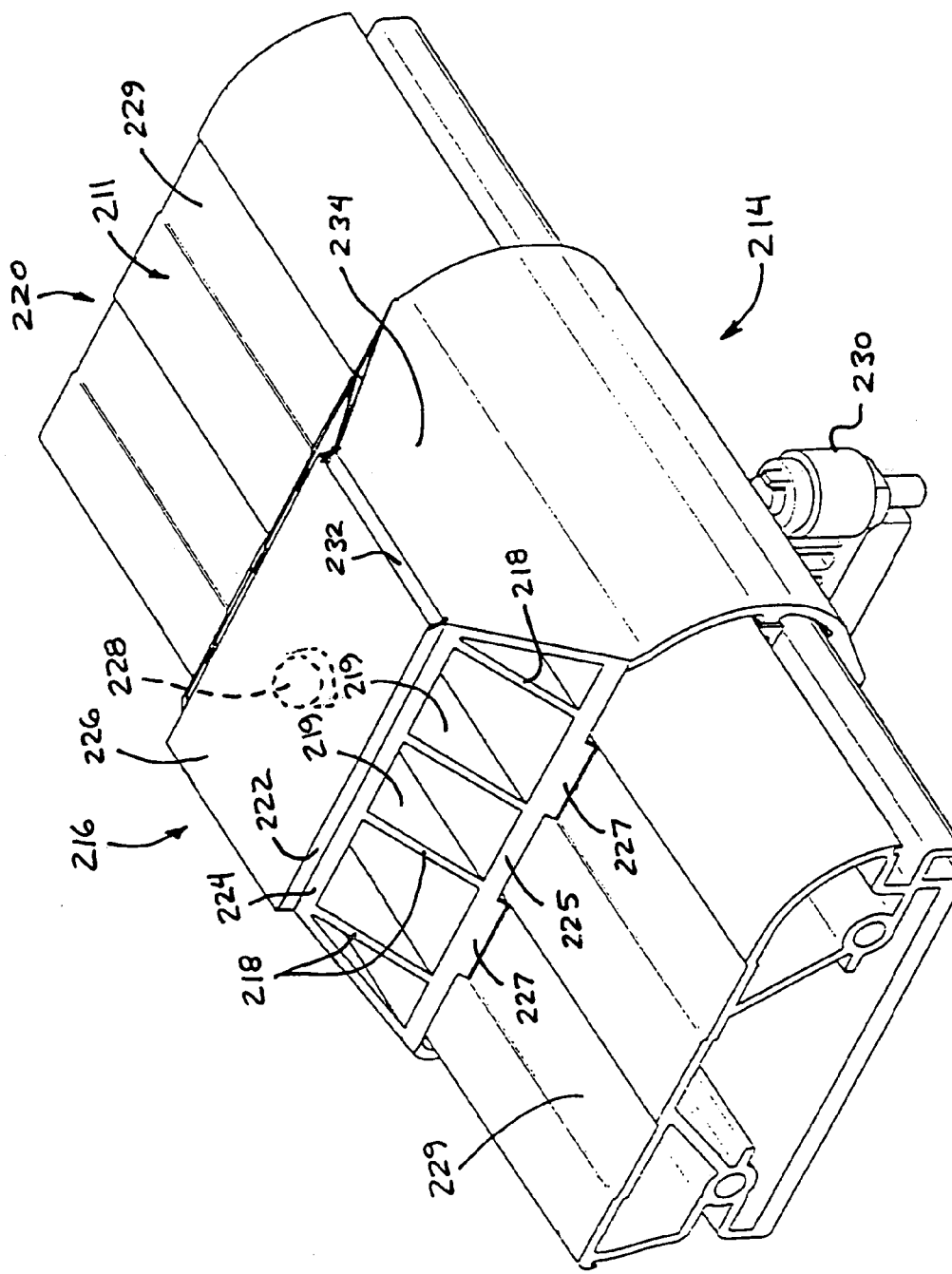
FIG. 12 is a perspective view of another pusher shoe or diverter shoe and slat combination in accordance with the present invention.
Figure 13:
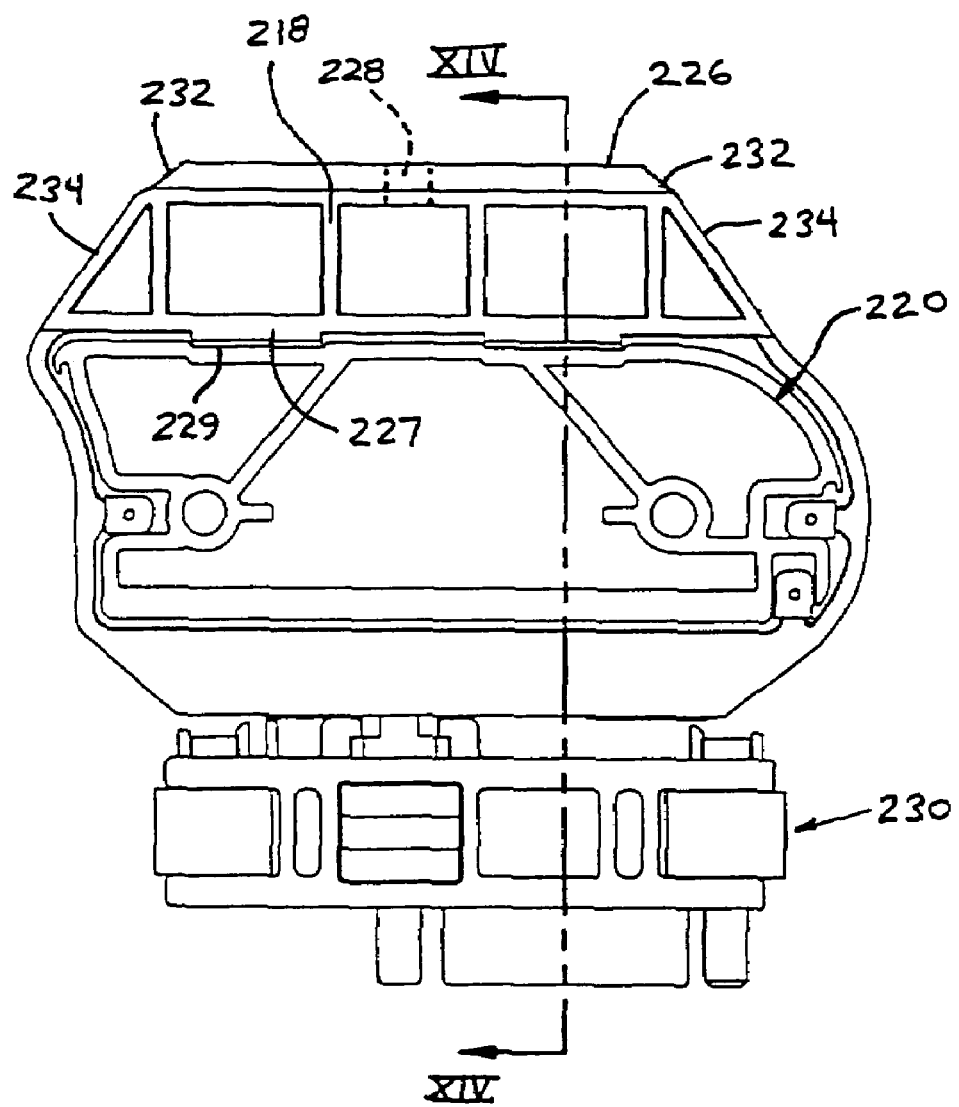
FIG. 13 is a side elevation of the pusher shoe and slat in FIG. 12.

Optionally, and as shown in FIG. 11, a pusher shoe 114'' may include a diverting portion 116'' that has a primary or initial diverting surface 118a'' and an angled or secondary or diagonal diverting surface 118b'', with an inclined end surface 132'.

Referring now to FIGS. 12-14B and 20, a pusher shoe 214 includes a diverting portion 216, which extends above a conveying surface 211. The diverting portion includes a diverting surface 218 which contacts an article and laterally displaces that article. In the illustrated embodiments of FIGS. 12-14B, diverting surface 218 is defined by end portions of a series of spaced apart wall segments 219, but may also be a solid surface as would be understood by those skilled in the art. The diverting surface 218 applies a lifting force to a portion of the article being displaced. In the embodiments illustrated in FIGS. 12-14B, this is accomplished by diverting surface 218 being at an incline with respect to the conveying surface 211. The diverting surface may be inclined with respect to the conveying surface at an angle that is less than 90 degrees. This angle may be less than approximately 45 degrees, and may be less than approximately 35 degrees. The diverting surface, in the illustrated embodiment, is at an angle that is approximately 25 degrees with respect to the conveying surface.

When an article contacts diverting surface 218, the contacting portion of the article tends to ride up the diverting surface which is what applies the lifting force to that portion of the article being diverted and absorbs energy. For most articles, it has been found that the article tends to ride partway up the diverting surface to a point where a balance of forces tend to limit further movement between the pusher shoe and the article. However, certain types of packages may continue to ride up diverting surface 218. In order to avoid the pusher shoe passing beneath such packages, a generally vertical stop surface 222 may be provided that extends upwardly from an upper portion 224 of diverting surface 218. An article riding up diverting surface 218 past upper portion 224 engages generally vertical surface 222 which arrests further movement between the pusher shoe and the article. Generally vertical surface 222 may extend at least approximately 0.25 inches above upper portion 224. Theoretically, there are no limits to the practical height of generally vertical surface 222, which may be several inches, or more, in height for handling certain types of packages, such as soft packages. Diverting portion 218 has a lower portion 225 adjacent conveying surface 211. In the illustrated embodiment, lower portion 225 includes one or more downwardly extending tabs 227 which ride below conveying surface 211, namely within shallow slots 229 (FIG. 12) defined in the upper portion of slat 220. The presence of the tab or tabs 227 assists the diverting surface 218 in extending or getting under the article in order to avoid occasionally diverting the article as a result of contact with lower portion 225.

Optionally, generally vertical surface 222 may be defined by a cap 226 which is fastened to diverting portion 216. Alternatively, generally vertical surface 222 may be integrally formed with diverting portion 216. Optionally, cap 226 may be connected with diverting portion 216, such as by a shear joint 228. Shear joint 228 is configured to break loose upon a placement of a relative force between cap 226 and diverting portion 216 that exceeds a particular level. Shear joint 228 provides protection to the sorter apparatus as follows. Should an article become jammed against a fixed obstacle, or a log jam of packages, or the like, the article will ride up diverting surface 218 and will be engaged by generally vertical stop surface 222. Because, under this scenario, the object will be incapable of free movement, a force will be applied to cap 226 that exceeds the shearing force of shear joint 228. This will cause the shear joint to break loose and the cap 226 to separate from the remaining portion of the diverting portion 216. The presence of a shear joint increases the likelihood that any damage to pusher shoe 214 caused by a jammed condition, or the like, will occur at diverting portion 216 which is easily accessible to a service technician. This tends to reduce failure at transfer element 230 which is below the conveying surface and would require at least partial disassembly of the conveying surface in order to make repair thereon. Therefore, the presence of a shear joint facilitates a reduction in maintenance cost in downtime to the sorter apparatus caused by a jam.

Figure 14:
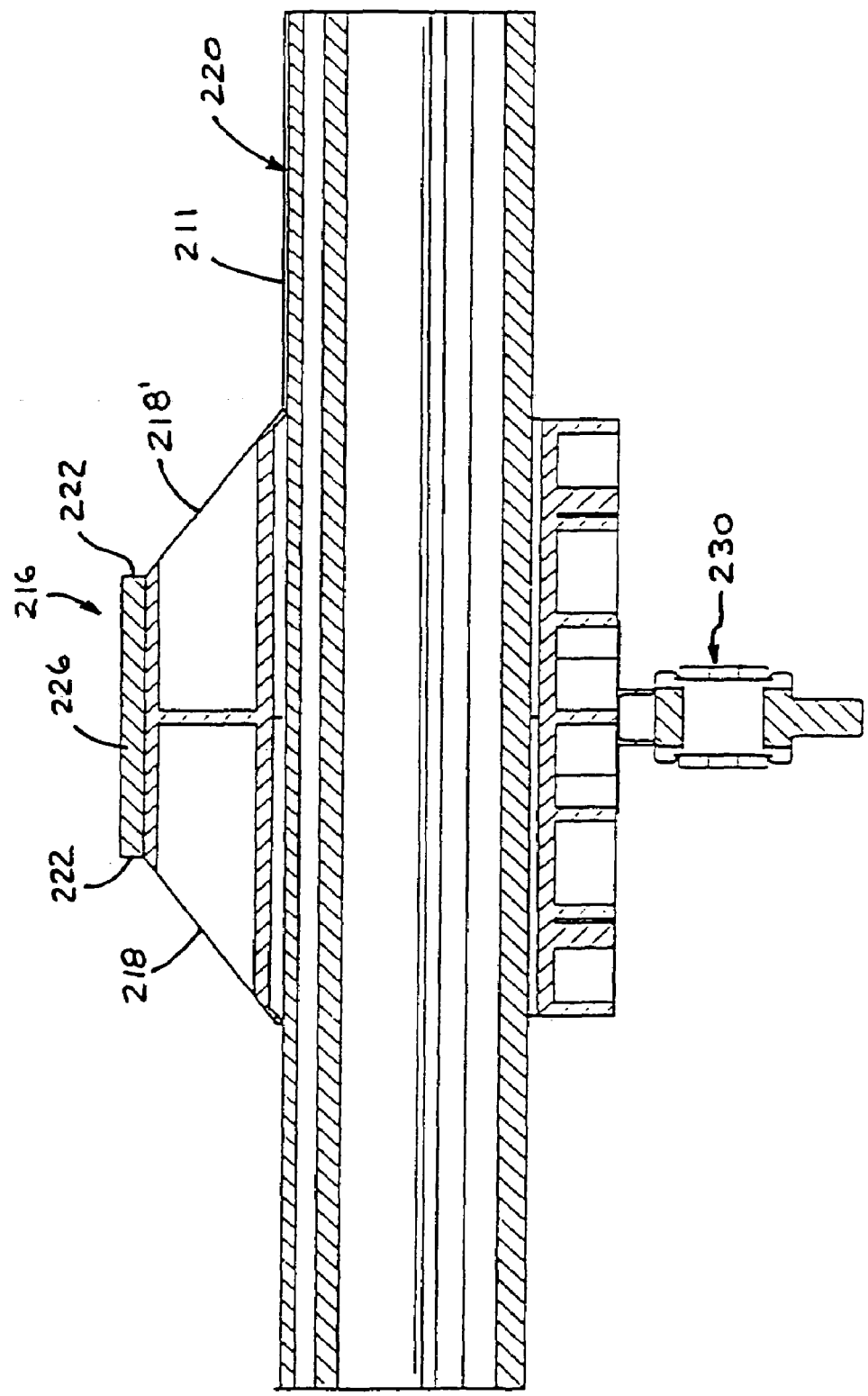
FIG. 14 is a sectional view taken along the lines XIV-XIV in FIG. 13.

Cap 226 may include leading and trailing surfaces 232 which are extensions of leading and trailing surfaces 234 defined by diverting portions 216. This assists movement of the pusher shoe under a package that is engaged by the leading or trailing surfaces of pusher shoe 214, as will be understood by the skilled artisan. As can best be seen by reference to FIGS. 14, 14A and 14B, pusher shoe 214 may be easily adapted to a left-hand divert, a right-hand divert, or a bi-lateral divert. In the embodiment illustrated in FIG. 14, a bi-lateral divert is provided by the presence of an additional generally vertical surface 222 at opposite lateral sides of cap 226. In the embodiment illustrated in FIG. 14A, in order to make a left-hand divert as viewed in FIG. 14A, cap 226a includes a generally vertical surface 222a and a sloping surface 236a which extends from generally vertical surface 222a to the other diverting surface 218'. In order to make a right-hand divert, as viewed in FIG. 14B, a generally vertical surface 222b is positioned on an opposite lateral side of a cap 226b, as illustrated in FIG. 14B, and which slopes down to a sloping surface 236b to a diverting surface 218. Thus, it is seen that only two, or perhaps three, configurations of a cap may be implemented in order to convert the sorter apparatus between a bi-lateral divert, a left-hand divert, or a right-hand divert. The remaining portions of the pusher shoes may be substantially identical. In the case of a left-hand or right-hand divert, respective sloping surfaces 236a, 236b tend to pass beneath a jammed package and thereby provide anti-jam protection.

Figure 15:
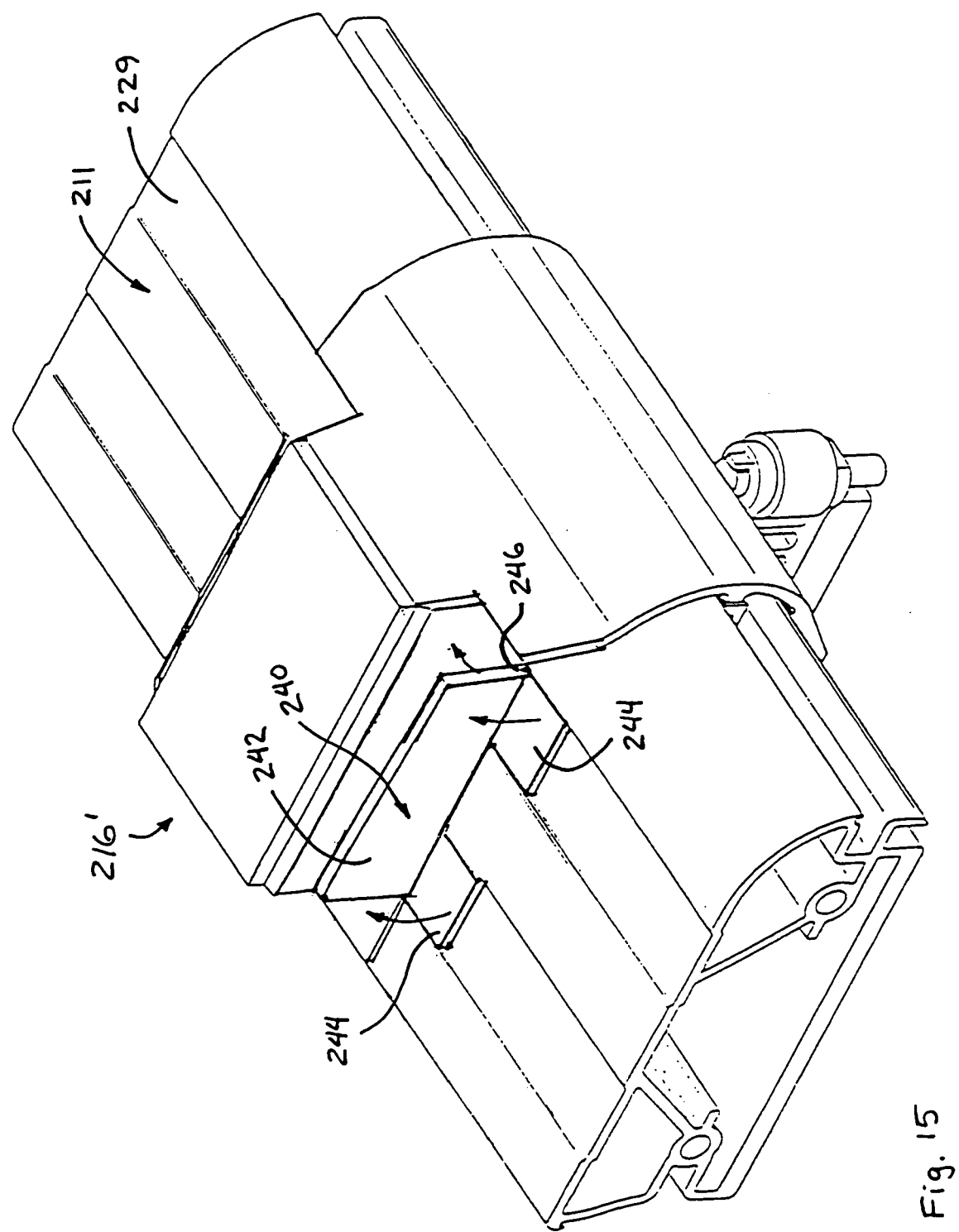
FIG. 15 is the same view as FIG. 12 of an alternative embodiment thereof.
Figure 16:
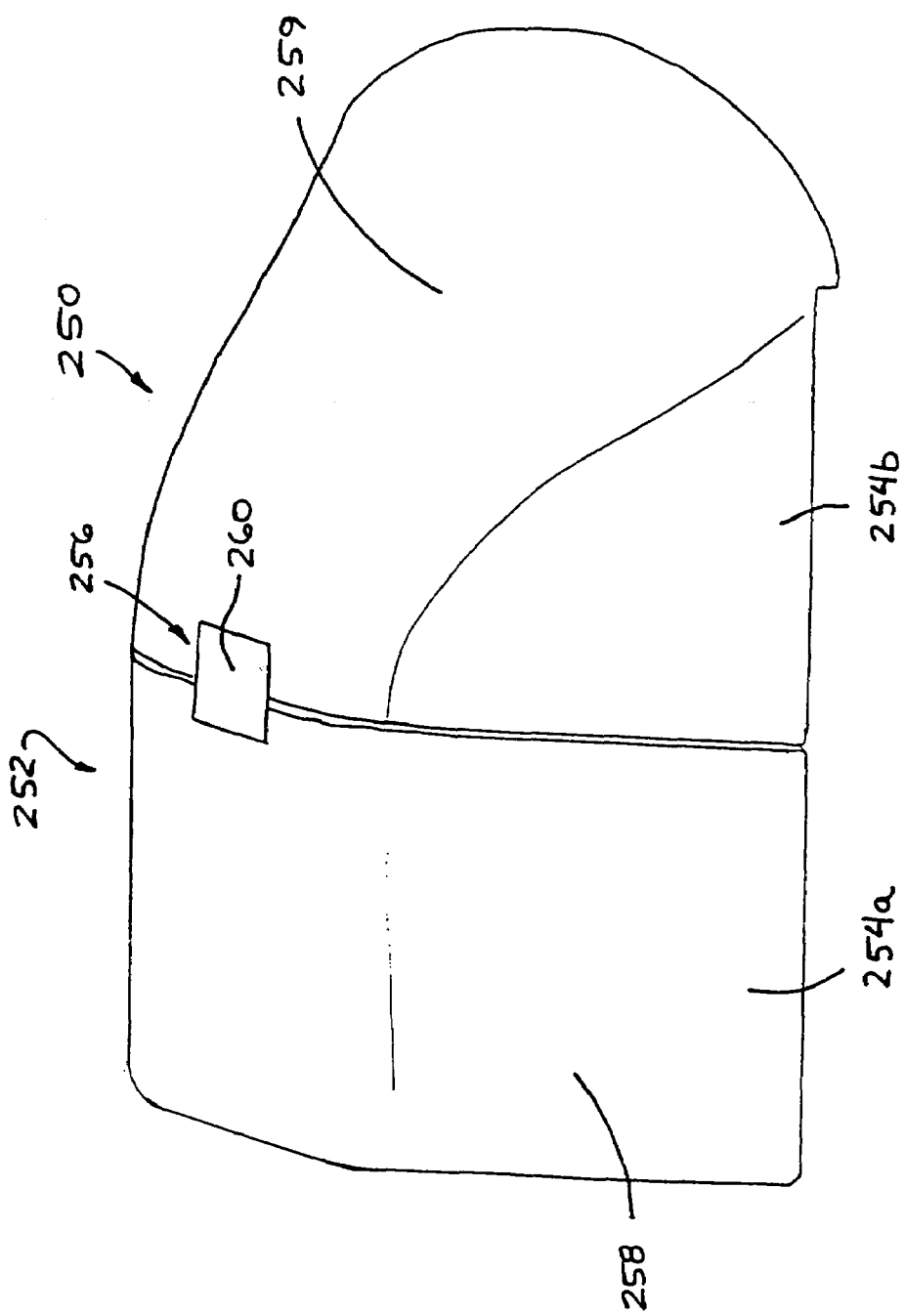
FIG. 16 is a perspective view of an alternative embodiment of a pusher shoe.
Figure 17:
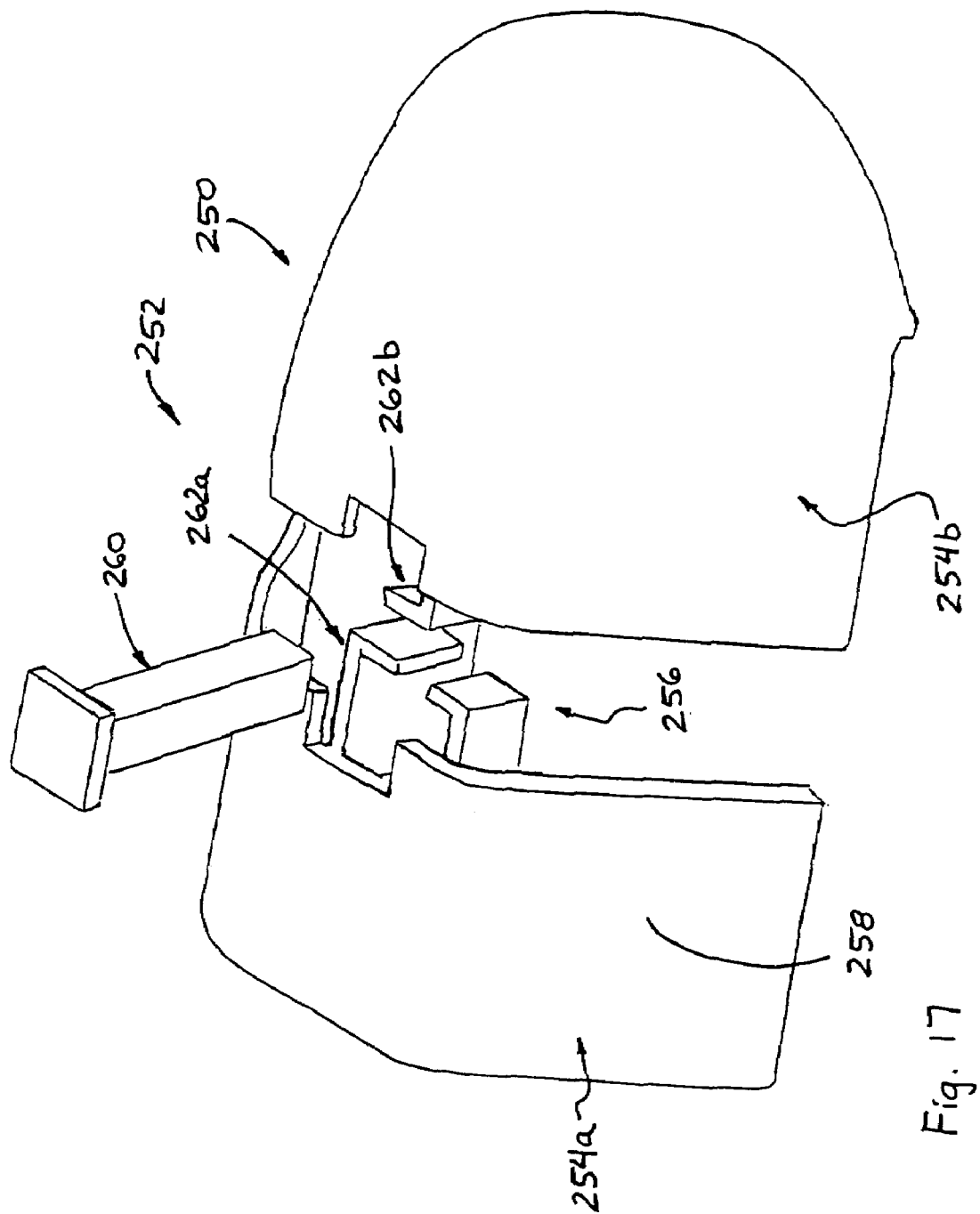
FIG. 17 is an exploded perspective view of the pusher shoe of FIG. 16.
Figure 18:
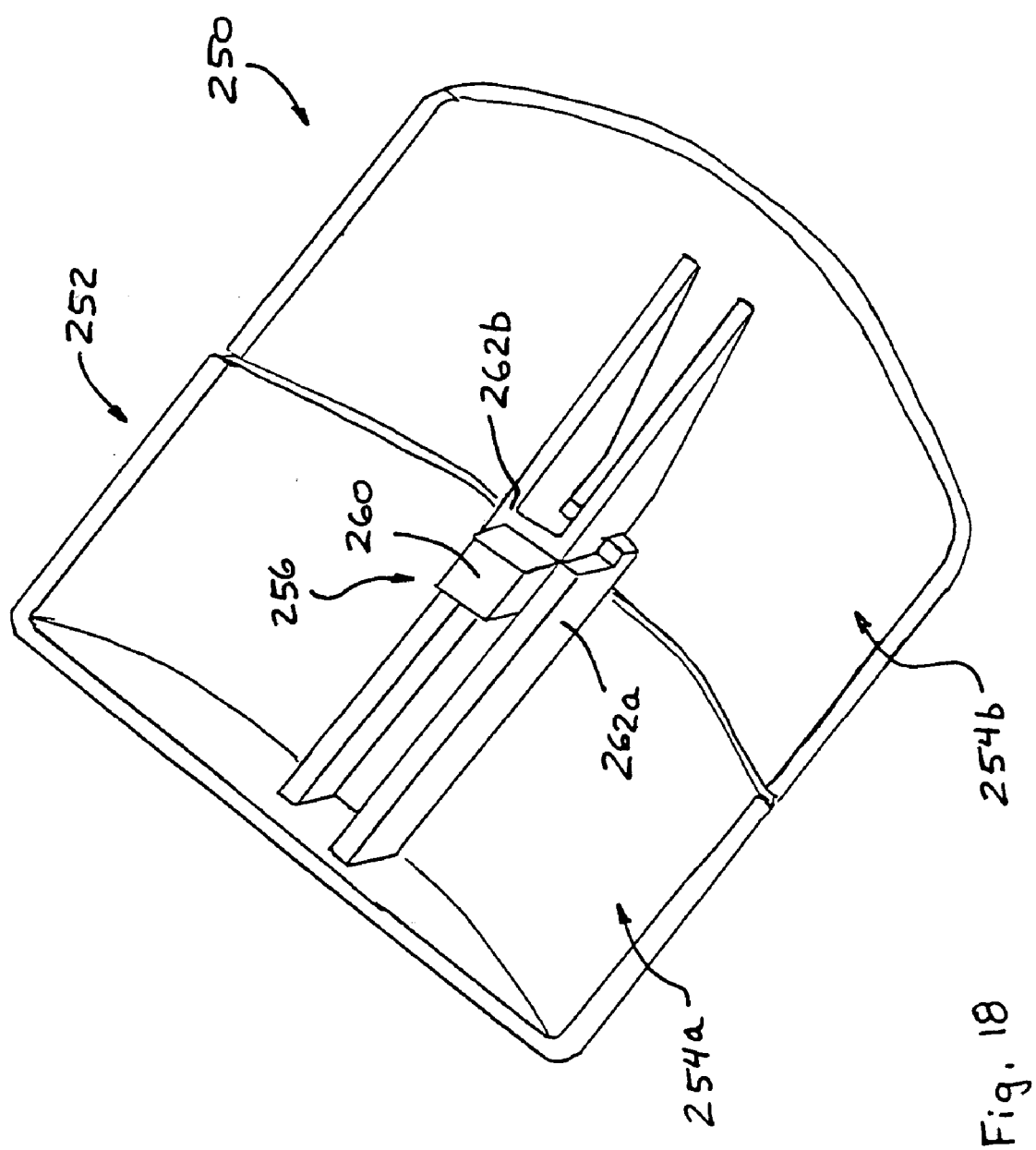
FIG. 18 is an underside perspective view of the pusher shoe of FIGS. 16 and 17.
Figure 19:
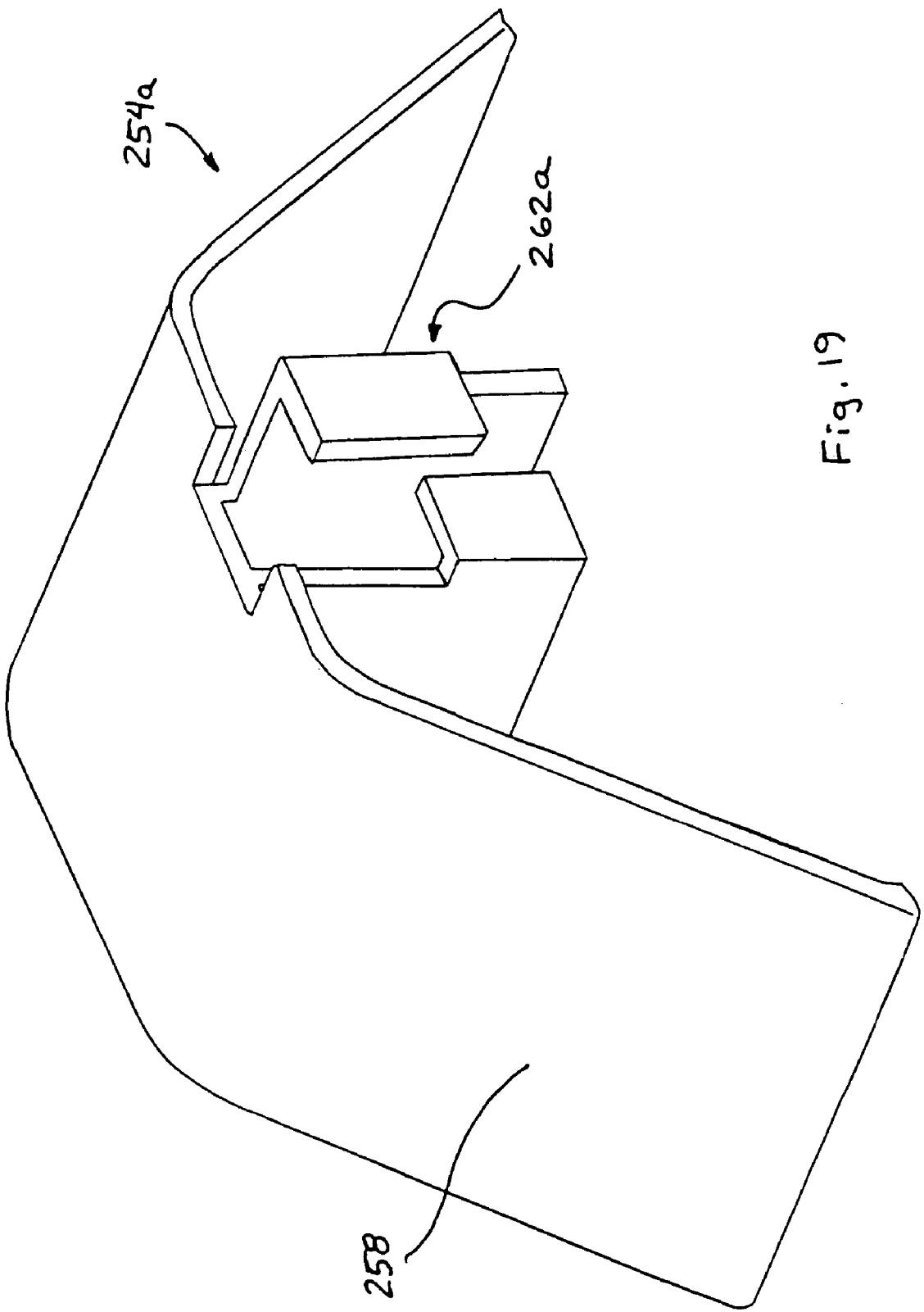
FIG. 19 is a perspective view similar to FIG. 17 illustrating a partial diverting portion of the pusher shoe.

In an alternative, less preferred, embodiment, illustrated in FIG. 15, a diverting surface 240 of a diverting portion 216' is defined by a contact surface portion 242 and a lifting surface portion surface 244. Diverting surface 240 applies a lifting force to a portion of the article being laterally displaced in a manner described below. An article being diverted passes over lifting surface portions 244 which are located within slots 229 below conveying surface 211. After the article passes over the lifting surface portions 244, the article engages contact surface portion 242. Diverting surface 240 is pivoted with respect to diverting portion 216', such as by a pivot joint 246. When the article engages contact surface portion 242, the diverting surface 244 pivots about pivot joint 246, thereby causing lifting surface portion 244 to pivot upwardly as illustrated by the arrows in FIG. 15. This places a lifting force to a portion of the article being displaced. Other examples of techniques utilized for applying a lifting force to a portion of the article being displaced will suggest themselves to the skilled artisan and are intended to be embraced by the invention.

In an alternative embodiment, and with reference to FIGS. 16-19, a pusher shoe 250 includes a diverting portion 252 having at least first and second members 254a, 254b which are joined by a shear joint 256. Member 254a may have a diverting surface 258, which may be a conventional generally vertical diverting surface, and sloping surface 259 which slopes downwardly from an upper extent of members 254a, 254b to the conveying surface (not shown in FIGS. 16-19). As illustrated, shear joint 256 may include a shear pin 260 which engages joining portions 262a of member 254a and 262b of member 254b. When pusher shoe 250 engages a fixed article which is jammed against a stationary object, and provided that sloping surface 259 does not pass beneath the article, shear pin 260 should either disengage from joint portions 262a, 262b or may otherwise break loose into separate members in order to allow diverting members 254a, 254b to separate, thereby causing the force implied on the pusher shoe to be absorbed by the diverting portion, not the transfer assembly. Thus, it is seen that at least an aspect of the present invention can be applied to more conventional pusher shoes having generally vertical diverting surfaces. It should be understood that the shear joints 228, 256 discussed herein are not limited to those depicted in the illustrated embodiments but may be implemented by other designs of shear joints that would suggest themselves to the skilled artisan.

Therefore, the present invention provides a diverter shoe that has a diverting surface and a stop surface. The diverting surface engages and pushes or moves an object or article while absorbing the impact at the article by allowing the article to move upward along the sloped diverting surface. The stop surface is at a greater angle than the diverting surface and functions to engage the article if the article moves upward to the upper end of the diverting surface, in order to substantially preclude the diverter shoe from sliding under the article. The diverting surface and stop surface may be at various angles, with the stop surface preferably being at a greater angle relative to the conveying surface than that of the diverting surface, and preferably being substantially vertical or normal to the conveying surface. The diverter shoe may include an angled or deflecting surface for directing or angling an article relative to the diverting surface to move the article diagonally across the conveying surface or to deflect articles out of the way of the diverter shoe if the article is not aligned with the diverter shoe.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A positive displacement sorter apparatus, comprising:
   a plurality of interconnected slats defining an endless web, an upper run of said web defining a conveying surface; and
   a plurality of pusher shoes, each moving along at least one of said plurality of slats to laterally displace articles on said conveying surface;
   wherein each of said pusher shoes includes a diverting portion above said conveying surface, said diverting portion including a generally planar diverting surface and a generally planar stop surface extending upward from an upper portion of said diverting surface and at an angle relative to said upper portion of said diverting surface, said diverting surface being at a first angle relative to said conveying surface and said stop surface being at a second angle relative to said conveying surface, said second angle being greater than said first angle, said diverting surface contacting an article and laterally displacing that article, said stop surface limiting movement of said pusher shoe relative to the article, wherein said diverting surface has a lateral dimension that is greater than a vertical dimension of said stop surface in order to divert at least some articles without the articles contacting said stop surface.

2. The sorter apparatus of claim 1, wherein said first angle is less than approximately 45 degrees.

3. The sorter apparatus of claim 2, wherein said second angle is greater than approximately 60 degrees.

4. The sorter apparatus of claim 2, wherein said second angle is approxitnately 90 degrees.

5. The sorter apparatus of claim 1, wherein said first angle is less than approximately 35 degrees.

6. The sorter apparatus of claim 1, wherein said first angle is approximately 25 degrees.

7. The sorter apparatus of claim 1, wherein said diverting surface has a lifting surface portion that is generally vertically movable from said conveying surface upon contact of said diverting surface with an article being laterally displaced.

8. The sorter apparatus of claim 1, wherein said diverting potion includes a shear joint at a junction between said diverting surface and said stop surface, wherein said shear joint is adapted to sever upon a force being applied to said stop surface of said pusher shoe that is above a particular level.

9. The sorter apparatus of claim 1, wherein said diverting surface comprises a first diverting surface and said sorter apparatus further comprises a second diverting surface, said first diverting surface being generally normal to the direction of travel of said pusher shoe, said second diverting surface being angled relative to said first diverting surface to diagonally divert an article across said conveying surface.

10. The sorter apparatus of claim 9, wherein said first diverting surface and said second diverting surface comprise generally planar surfaces.

11. The sorter apparatus of claim 10, wherein said stop surface extends upward from an upper portion of one of said first and second diverting surfaces.

12. The sorter apparatus of claim 10, wherein said stop surface comprises first and second stop surfaces, said first stop surface extending upward from an upper portion of said first diverting surface and said second stop surface extending upward from an upper portion of said second diverting surface.

13. The sorter apparatus of claim 1, wherein at least a portion of said diverting surface extends below said conveying surface.

14. The sorter apparatus of claim 13, wherein at least one tab at a lower portion of said diverting surface extends within at least one channel formed in said conveying surface.

15. The sorter apparatus of claim 1, wherein said diverting surface applies a lifting force to a portion of the article being laterally displaced.

16. The sorter apparatus of claim 1, wherein said diverting portion includes another diverting surface facing away from said diverting surface, said another diverting surface being inclined relative to said conveying surface, said another diverting surface contacting an article and laterally displacing that article, said diverting surface applying a lifting force to a portion of the article being laterally displaced.

17. The sorter apparatus of claim 16, wherein said diverting portion includes an inclined surface facing away from said stop surface, said inclined surface being at a third angle relative to said conveying surface that is less than said second angle.

18. The sorter apparatus of claim 16, wherein said diverting portion includes another stop surface facing away from said stop surface, said another stop surface being at said second angle relative to said conveying surface.

19. The pusher shoe of claim 1, wherein at least a portion of said diverting surface extends downward so as to be at least partially below the conveying surface when said pusher shoe is mounted to said base portion.

20. A positive displacement sorter apparatus, comprising:
a plurality of interconnected slats defining an endless web, an upper run of said web defining a conveying surface; and
a plurality of pusher shoes, each moving along at least one of said plurality of slats to laterally displace articles on said conveying surface;
wherein each of said pusher shoes includes a diverting portion extending above said conveying surface, said diverting portion including a diverting surface, said diverting surface contacting an article and laterally displacing that article, wherein said diverting surface is inclined with respect to said conveying surface from a lower portion generally adjacent to said conveying surface to an upper portion, thereby applying a lifting force to a portion of the article being displaced, said diverting portion including a cap at said upper portion of said diverting surface, said cap defining a stop surface extending upwardly from said upper portion of said diverting surface, wherein said cap is connected to said upper portion of said diverting surface at a shear joint, wherein said shear joint is adapted to sever in response to a force being applied to said stop surface of said cap that is above a particular level.

21. The sorter apparatus of claim 20, wherein said generally vertical surface extends upwardly from said upper portion by at least approximately 0.25 inches.

22. The sorter apparatus of claim 20, wherein said stop surface comprises a generally vertical surface.

23. The sorter apparatus of claim 20, wherein said lower portion of said diverting surface extends at least in part below said conveying surface.

24. The sorter apparatus of claim 20 including another diverting surface facing away from said diverting surface, wherein said another diverting surface is inclined with respect to said conveying surface from another lower portion adjacent said conveying surface to another upper portion, thereby applying a lifting force to a portion of the article being displaced.

25. The sorter apparatus of claim 24 wherein said cap slopes generally downwardly from an upper extent of said stop surface to said another upper portion.

26. The sorter apparatus of claim 20, wherein said shear joint comprises a narrowed wall thickness relative to said diverting surface and said generally vertical surface and is adapted to sever upon a force being applied to said cap that is above a particular level.

27. The sorter apparatus of claim 24, wherein said cap includes another stop surface extending upwardly from said another upper portion.

28. The sorter apparatus of claim 20, wherein said diverting surface is inclined with respect to said conveying surface at an angle that is less than approximately 45 degrees.

29. A positive displacement sorter apparatus, comprising:
a plurality of interconnected slats defining an endless web, an upper run of said web defining a conveying surface; and a plurality of pusher shoes, each moving along at least one of said plurality of slats to laterally displace articles on said conveying surface;

wherein each of said pusher shoes includes a diverting portion generally extending above said conveying surface, said diverting portion including a lower surface and an upper surface extending upwardly from said lower surface, said lower surface comprising a first diverting surface and a second diverting surface adjacent to said first diverting surface, said fast diverting surface being generally normal to the direction of travel of said pusher shoe, said second diverting surface being angled relative to said first diverting surface, said upper surface comprising a first stop surface and a second stop surface adjacent to said First stop surface, said first stop surface and said second stop surface extending upwardly from said first diverting surface and said second diverting surface, respectively, said first diverting surface contacting an article and laterally displacing that article, said first stop surface limiting movement of said pusher shoe relative to the article as said first diverting surface laterally displaces the article, wherein said first diverting surface has a lateral dimension that is greater than a vertical dimension of said first stop surface in order to divert at least some articles without the articles contacting said first stop surface.

30. The sorter apparatus of claim 29, wherein said second diverting surface contacts and diverts an article diagonally across said conveying surface, said second stop surface limiting movement of said pusher shoe relative to the article as said second diverting surface diverts the article.

31. The sorter apparatus of claim 29, wherein said first diverting surface is at a first angle relative to said conveying surface and said first stop surface is at a second angle relative to said conveying surface, said second angle being greater than said first angle.

32. The sorter apparatus of claim 31, wherein said first angle is less than approximately 45 degrees.

33. The sorter apparatus of claim 31, wherein said second angle is greater than approximately 60 degrees.

34. The sorter apparatus of claim 29, wherein said first diverting surface and said second diverting surface comprise generally planar surfaces.

35. The sorter apparatus of claim 34, wherein said first stop surface and said second stop surface comprise generally planar surfaces.

36. The sorter apparatus of claim 29, wherein said first diverting surface applies a lifting force to a portion of the article being laterally displaced.

37. The sorter apparatus of claim 29, wherein said diverting portion includes another first diverting surface, second diverting surface, first stop surface and second stop surface facing away from said first diverting surface, second diverting surface, first stop surface and second stop surface, said diverting portion being configured to laterally displace articles when said pusher shoe is moving in either direction along said slat.

38. The sorter apparatus of claim 29, wherein said diverting portion includes a shear joint at a junction between said upper surface and said lower surface, wherein said shear joint is adapted to sever upon a force being applied to said upper surface of said pusher shoe that is above a particular level.

39. A positive displacement sorter apparatus, comprising:
a plurality of interconnected slats defining an endless web, an upper run of said web defining a conveying surface;

a plurality of pusher shoes, each moving along at least one of said plurality of slats to laterally displace articles on said conveying surface;

wherein each of said pusher shoes comprises a cap extending above said conveying surface, each of said pusher shoes further comprising a diverting surface that extends upward from said conveying surface for contacting an article and laterally displacing that article; and wherein said cap has a shear joint, wherein said shear joint is adapted to sever upon a force being applied to said cap that is above a particular level.

40. The sorter apparatus of claim 39, wherein said diverting surface comprises an inclined surface that applies a lifting force to the article as it contacts and laterally displaces the article.

41. The sorter apparatus of claim 40, wherein said shear joint is located at a junction between said cap and an upper portion of said inclined diverting surface.

42. The sorter apparatus of claim 41, wherein said cap defines a generally vertical stop surface, said shear joint being adapted to sever in response to a force being applied to said stop surface that is above a particular level.

43. The sorter apparatus of claim 39, wherein said shear joint is located at a junction between said cap and an upper portion of said diverting surface.

44. The sorter apparatus of claim 43, wherein said shear joint comprises a narrowed wall thickness relative to said diverting surface and said cap and is adapted to sever in response to a force being applied to said cap that is above a particular level.

45. The sorter apparatus of claim 39, wherein said shear joint comprises a narrowed wall thickness of said pusher shoe and is adapted to sever in response to a force being applied to said cap that is above a particular level.

46. A pusher shoe for a positive displacement sorter apparatus, said pusher shoe comprising:
a mounting portion configured to mount said pusher shoe to a base portion of said positive displacement sorter apparatus; and a diverting portion generally above said base portion, said diverting portion including a generally planar diverting surface and a generally planar stop surface extending upward from an upper portion of said diverting surface and at an angle relative to said upper portion of said diverting surface, said diverting surface being at a first angle relative to a conveying surface when said pusher shoe is mounted to the base portion, and said stop surface being at a second angle relative to the conveying surface when said pusher shoe is mounted to the base portion, said second angle being greater than said first angle, said diverting surface contacting an article and laterally displacing that article as the base portion and said pusher shoe are moved along at least one slat of said positive displacement sorter apparatus, said stop surface lifting movement of said pusher shoe relative to the article, wherein said diverting surface has a lateral dimension that is greater than a vertical dimension of said stop surface in order to divert at least some articles without the articles contacting said stop surface.

47. The pusher shoe of claim 46, further comprising a shear joint at a junction between said diverting surface and said stop surface, wherein said shear joint is adapted to sever upon a force being applied to said stop surface of said pusher shoe that is above a particular level.

48. The pusher shoe of claim 46, wherein said diverting surface comprises a first diverting surface and said pusher shoe further comprises a second diverting surface, said first diverting surface being generally normal to the direction of travel of said pusher shoe, said second diverting surface being angled relative to said first diverting surface to diagonally divert an article across the conveying surface.

49. The pusher shoe of claim 48, wherein said stop surface comprises first and second stop surfaces, said first stop surface extending upward from an upper portion of said first diverting surface and said second stop surface extending upward from an upper portion of said second diverting surface.

50. A pusher shoe for a positive displacement sorter apparatus, said pusher shoe comprising:

a mounting portion configured to mount said pusher shoe to a base portion of said positive displacement sorter apparatus;

a diverting surface that extends upward from a conveying surface for contacting an article and laterally displacing that article as said base portion and said pusher shoe are moved relative to the conveying surface; and a shear joint, wherein said shear joint comprises a narrowed wall thickness of said pusher shoe and is adapted to sever upon a force being applied to said diverting surface that is above a particular level.

51. The pusher shoe of claim 50, wherein said diverting surface comprises an inclined surface that applies a lifting force to the article as it contacts and laterally displaces the article.

52. The pusher shoe of claim 50, wherein said diverting surface comprises an inclined diverting surface and a stop surface extending upward from an upper portion of said inclined diverting surface.

53. The pusher shoe of claim 52, wherein said shear joint is located at a junction between said stop surface and said upper portion of said inclined diverting surface.

54. The pusher shoe of claim 53, wherein said stop surface defines a generally vertical stop surface, said shear joint being adapted to sever in response to a force being applied to said stop surface that is above a particular level.

* * * * *

UNITED STATES PATENT AND TRADEMARK OFFICE
CERTIFICATE OF CORRECTION

PATENT NO. : 7,249,668 B2 Page 1 of 1
APPLICATION NO. : 10/903707
DATED : July 31, 2007
INVENTOR(S) : Verploegen et al.

It is certified that error appears in the above-identified patent and that said Letters Patent is hereby corrected as shown below:

Column 4
Line 33, "veit" should be --Veit--
Line 36, "SORTER." should be --SORTER,--

Column 11
Claim 4, Line 11, "approxitnatcly" should be --approximately--
Claim 8, Line 22, "potion" should be --portion--

Column 13
Claim 29, Line 10, "fast" should be --first--

Column 14
Claim 46, Line 56, "lifting" should be --limiting--

Signed and Sealed this

Twentieth Day of January, 2009

JON W. DUDAS
*Director of the United States Patent and Trademark Office*